(12) United States Patent
Lundbäck

(10) Patent No.: US 10,883,240 B2
(45) Date of Patent: Jan. 5, 2021

(54) SKIMMING AND SEPARATION DEVICE—PERIPHERAL VERTICAL FLOW

(71) Applicant: Surfcleaner AB, Vaxholm (SE)

(72) Inventor: Stig Lundbäck, Vaxholm (SE)

(73) Assignee: SURFCLEANER AB, Vaxholm (SE)

( * ) Notice: Subject to any disclaimer, the term of this patent is extended or adjusted under 35 U.S.C. 154(b) by 0 days.

(21) Appl. No.: 16/315,309

(22) PCT Filed: May 23, 2017

(86) PCT No.: PCT/SE2017/050552
§ 371 (c)(1),
(2) Date: Jan. 4, 2019

(87) PCT Pub. No.: WO2018/009117
PCT Pub. Date: Jan. 11, 2018

(65) Prior Publication Data
US 2019/0309493 A1    Oct. 10, 2019

(30) Foreign Application Priority Data
Jul. 6, 2016    (SE) .................................... 1650984

(51) Int. Cl.
*E02B 15/10* (2006.01)
*E02B 15/04* (2006.01)
(Continued)

(52) U.S. Cl.
CPC ........ *E02B 15/106* (2013.01); *B01D 17/0214* (2013.01); *B01D 21/2433* (2013.01); *E02B 15/048* (2013.01)

(58) Field of Classification Search
CPC .. E02B 15/106; E02B 15/048; Y10S 210/923; Y02A 20/204; B01D 17/0214; B01D 21/2433
See application file for complete search history.

(56) References Cited

U.S. PATENT DOCUMENTS 3,237,774 A * 3/1966 Schuback ............. E02B 15/106
                                                210/242.3
3,268,079 A * 8/1966 Sharrow, Jr. .......... E04H 4/1272
                                                210/167.19
(Continued)

FOREIGN PATENT DOCUMENTS

GB    1 472 663 A    5/1977
JP    H06339645 A   12/1994
(Continued)

OTHER PUBLICATIONS

International Preliminary Report on Patentability for corresponding Patent Application No. PCT/SE2017/050552 dated Jan. 17, 2019.
(Continued)

*Primary Examiner* — Terry K Cecil
(74) *Attorney, Agent, or Firm* — Renner, Otto, Boisselle & Sklar, LLP

(57) ABSTRACT

A skimming and separation device includes an outer casing defining a compartment, a floater that provides a skimming function, the floater being attached at its lower side to a vertically arranged bellow allowing the floater to adapt flow into a substantially circum volume and to move from an upper position with essentially no flow into the compartment to a lower position allowing flow of water and debris to follow the contours of the floater in a downward direction. The device further includes a power device with a propeller, the power device being controlled by a control unit such that various kinds of flows and pressures may be generated to control the in-flow and outflow of the device. At least one peripheral flow deflecting member achieves a rotational movement of downward directed flow of water and debris, in a horizontal plane and around a vertical longitudinal center axis of the device.

13 Claims, 22 Drawing Sheets

(51) Int. Cl.
*B01D 21/24* (2006.01)
*B01D 17/02* (2006.01)

(56) References Cited

U.S. PATENT DOCUMENTS

| | | | |
|---|---|---|---|
| 3,800,951 | A | 4/1974 | Mourlon et al. |
| 3,933,654 | A * | 1/1976 | Middelbeek ....... B01D 17/0211 |
| | | | 210/521 |
| 4,067,811 | A | 1/1978 | Dallamore |
| 5,520,136 | A * | 5/1996 | Yamaguchi ............ B63B 35/32 |
| | | | 114/382 |
| 6,015,501 | A | 1/2000 | Lundback |
| 6,274,046 | B1 | 8/2001 | Lundback |
| 6,458,282 | B1 | 10/2002 | Lundback |
| 6,743,358 | B1 | 6/2004 | Lundback |
| 7,807,059 | B2 | 10/2010 | Lundback et al. |
| 2016/0053455 | A1 | 2/2016 | Lundback |

FOREIGN PATENT DOCUMENTS

| | | |
|---|---|---|
| SE | 514 756 C2 | 4/2001 |
| WO | 97/07292 | 2/1997 |
| WO | 99/22078 | 5/1999 |
| WO | 2014/168577 A1 | 10/2014 |
| WO | 2017/095302 A1 | 6/2017 |

OTHER PUBLICATIONS

International Search Report for corresponding Patent Application No. PCT/SE2017/050552 dated Jul. 27, 2017.
English Translation of Office Action and Search Report for corresponding Chinese Application No. 201780054772 dated Jul. 20, 2020.

* cited by examiner

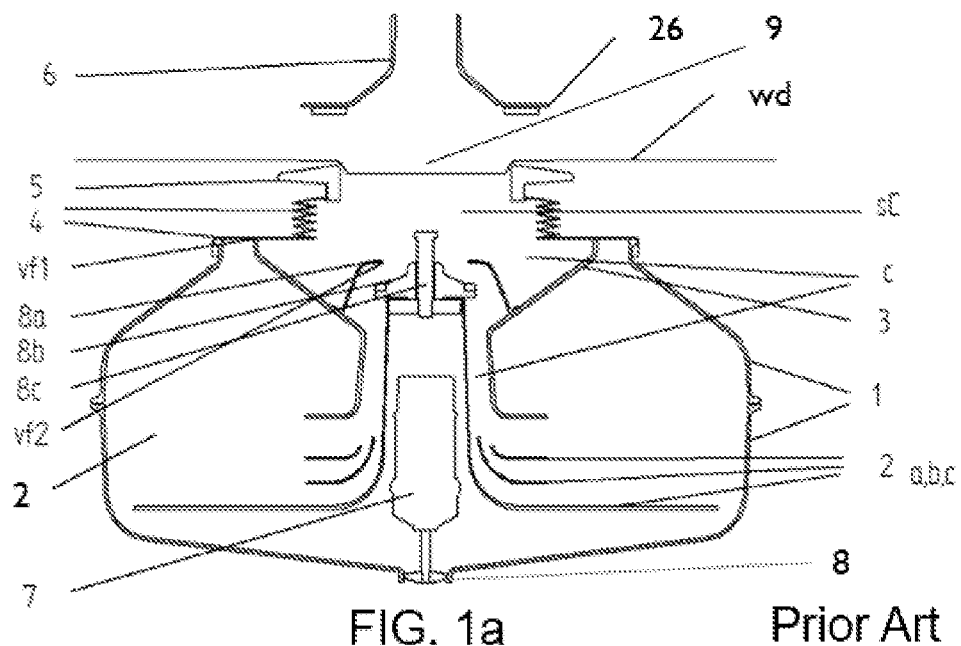
FIG. 1a  Prior Art
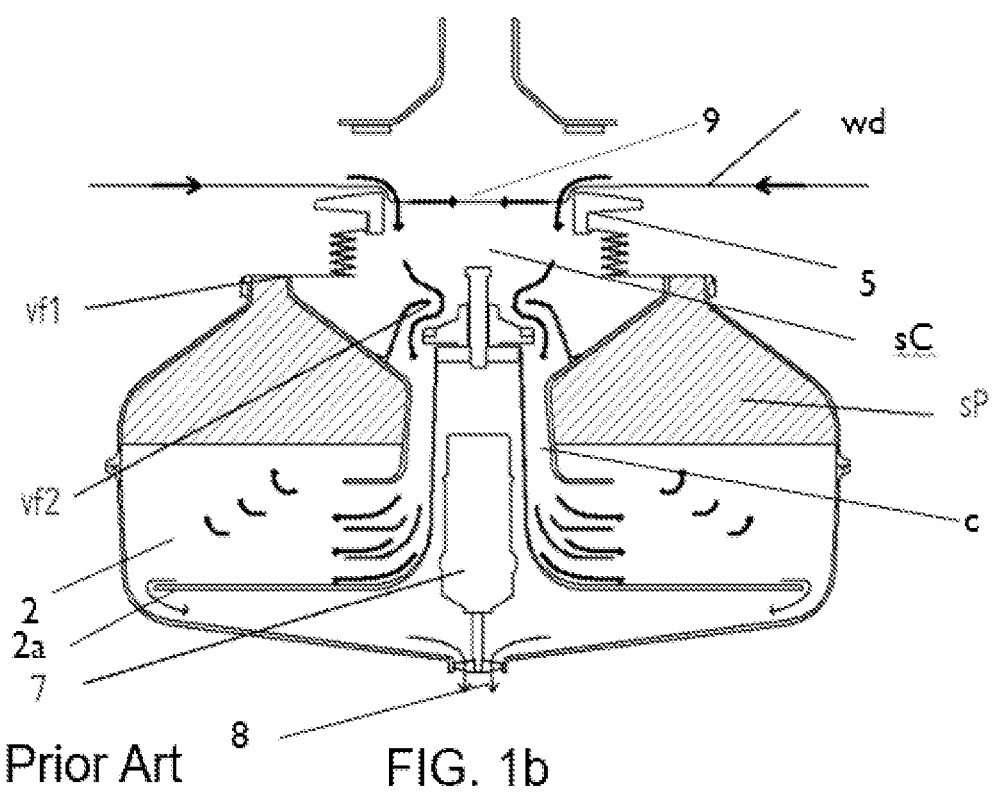
Prior Art  FIG. 1b

SKIMMING AND SEPARATION DEVICE—PERIPHERAL VERTICAL FLOW

FIELD OF THE INVENTION

The present disclosure relates to a skimming and separation device according to the preamble of the independent claim.

BACKGROUND OF THE INVENTION

Herein is disclosed a skimming and separation device for collecting material floating on the surface, that may be applied for collecting different kinds of pollutants, like solids, weeds, foam, algae and oils, floating on the water. The technique applied by the device is basically based upon gravimetric separating methods which mean that pollutants having a lower density than water will float up on to the top of the water level. The speed of the flotation is not only depending on differences in density forces but also to a large extent depending of the structures, shapes and areas etc. of the pollutants.

There are many examples of skimming and separating devices that are described as suitable for collecting oil spilled on a water surface, including oil mixed with solid material.

In WO-97/07292 and WO-99/22078 various examples of prior art system are disclosed. Furthermore, U.S. Pat. Nos. 6,743,358, 7,807,059 and WO-2014/168577 disclose systems and devices related to the skimming and separation device to be disclosed in the present application (see e.g. FIG. 1).

These known systems and apparatuses comprise a collection vessel provided with a side wall comprising an upper wall part, a floater, which has some buoyancy. The floater is attached at its lower side to an essentially vertically arranged bellow allowing the floater to move from an upper position where no flow may enter the apparatus to a lower position forming a skimming weir allowing flow of water and debris to follow the contours of the floater and hit an open circular water compartment, the skimming compartment, with a water level that is determined by the speed of a propeller, the floating forces of the floater and the force gradients acting on the bellow in relation to the water level in the skimming compartment.

In one known device disclosed in U.S. Pat. No. 6,743,358 the circular skimming water compartment is at its upper end in open contact with atmospheric pressure and at its lower end delimited by a wall that holds the inlet of the collection vessel from the skimming compartment.

In WO-2014/168577 is disclosed a skimming and separation device provided with angulated nozzles (see FIG. 2), arranged to achieve a flow from the skimming compartment to the closed separating and collecting compartment. The angulated nozzles make the fluid including the pollutants to obtain a slow rotating motion within the separation and discharge compartment. The slow rotation of the fluid in the separation and discharge compartment makes a large horizontal area with no streamers that can jeopardize the homogenous vertical speed in the compartment provided by the discharge means (propeller) at the bottom of the separation compartment. Thus the discharge of fluid in the bottom of the separation compartment will generate a vertically oriented speed. This speed may be adjusted to be lower than the speed that the gravitational separation forces are generated to bring the pollutants towards the discharge volume and area of the separating and collecting compartment.

The separation and collecting compartment is delimited upward by a top wall with a valve and discharge opening through which the oil and other pollutants may be expelled, by an equal exchange of water and/or pollutants entering into the separating and collecting compartment.

Water can be fed into the closed separating and collecting compartment through the collection vessel open to the skimming compartment and return to the sea through an opening in the bottom wall of the collection vessel, where a motor and propeller are arranged.

The collected debris is discharged from the collection compartment of the devices in the referred patents and patent applications by reversing the propeller and feeding water into the separating and collection compartment. This leads to a backflow through the collecting vessels causing the floater of skimming weir to be pressed against an overlying plate leading to a closure and pressure increase in the skimming and collecting compartment. This will further result in a pressure increase in the separating and collection compartment resulting in that collected oil in the collecting compartment will be pressurized and be expelled through the valve and discharge opening into a suitable recipient (see FIG. 1). The generated rotation of water and pollutants described in WO-2014/168577 is advantageous in many aspects. However, in some situations solid objects of various kinds are carried along by e.g. oil and foam, and might start clogging in the discharge volume while waiting for the discharge phase.

Basically the skimming and separation flow patterns through the device can be described as following two main basic flow patterns down into the separating and collecting compartment.

The first basic flow pattern is disclosed in FIG. 1 as a central vertical flow (cvF) technology platform with known embodiments. According to this flow pattern a flow of concentrated pollutants from the concentrating compartment is provided downward along a central vertical path to the separating and collecting compartment where baffle arrangements are used to reduce flow streamers that can disturb the separating phase.

The second basic flow pattern is disclosed in FIG. 2 as a peripheral vertical flow (pvF) technology platform. According to this flow pattern a flow of concentrated pollutants from the concentrating compartment is provided down to the separating and collecting compartment in a peripheral location of the compartment. This may be achieved e.g. by a plurality of vertical peripheral tubing and where these tubing are provided with angular outflow openings to generate a slow rotational motion in a horizontal plane to reduce flow streamers that can disturb the separating phase.

Common for both these basic flow patterns (cvF) and (pvF) is that by reversing the flow (by reversing the rotational direction of the propeller) through the separator and storage compartment an over pressure is created and a flow is generated such that collected pollutants are forced out from the compartment to suitable external storage containers.

Devices with central vertical flow (cvF) pattern have an internal storage compartment and during the emptying phase, by means of the applied over pressure, a valve on the top of the storage compartment is opened allowing the stored pollutant to flow into the skimming concentrating compartment to be further pressurized through an outflow tract that is formed by the hydraulically closed skimming wear and the outflow tract in the top lid of the skimming and separator device. In order to increase the pressure on to the collected pollutants in the separating and collecting compartment a valve function is closing off a returning flow through the central transporting tub during the emptying phase (see FIG. 1).

Devices with the peripheral vertical flow (pvF) pattern have all the time during its ongoing skimming and separating functions a direct communication to the outflow tract of the skimming and separating apparatus that during the collecting phase is closed to the atmospheric pressure by a valve (vf3)(see FIG. 2). During the emptying phase with reversed flow through the propeller, the whole compartment of the separator will be pressurized due to the hydraulic closing of the skimming wear which means that the outflow valve will be open for transportation of collected pollutants to a suitable storage tank.

In all the referred devices solid pollutants such as e.g. bottle caps, pieces of plastic, pieces of bark and wood, leaves or other plant debris are as well as liquid pollutants allowed to enter into the main separating and collecting compartment. Pollutants with irregular shapes and large areas etc. will gain such a hard resistance in its flotation towards the surface area that they need a very long time to enter on to the discharge zone which means that the vertical operated speed in the separating and collecting compartment has to be very low, resulting in an overall low capacity of the device. Furthermore, these kind of pollutants does not coalesce on filters instead they rather clog them. In addition they have a tendency to aggregate into fabric like masses during their storage in the collecting compartment.

In other occasions floating debris can carry heavier debris like e.g. sand that during the skimming and or separating phase separates and thus will sediment on to the horizontal arranged baffles and on to the bottom of the separator that can result in uneven flow distributions and malfunctions of the separator.

Furthermore, in some occasions the intermittent discharging phases applied in e.g. the system of WO-2014/168577 may influence the transportation of pollutants from the separator to a suitable collecting tank. In addition, intermittent discharging phases are time consuming and may lower the overall capacity of the skimming and separation device.

Thus, the general object of the present invention is to achieve an improved skimming and separation device that eliminates, or at least mitigates, the above stated drawbacks. The present invention is in particular related to achieve an improved skimming and separation device of the earlier known peripheral vertical flow platform (pvF) by transforming it into a new peripheral, rotating vertical and horizontal flow platform (prvhF) and further into a new centrifugal collecting flow pattern (ccF).

The improved device is less time-consuming to use, has a higher capacity, and has the capability of an improved handling of especially solid pollutants with irregular shapes and large areas, such as e.g. bottle caps, pieces of plastic, pieces of bark and wood, leaves or other plant debris. In addition, this improved device is suitable to collect liquid pollutants, floating solid debris, proteins in a mixture of combinations.

SUMMARY OF THE INVENTION

At least the above-mentioned objects are achieved by the present invention according to the independent claim. Preferred embodiments are set forth by the dependent claims.

The skimming and separation device according to the present invention is directed to provide modified constructions related to the earlier known peripheral vertical flow platform (pvF) and/or with baffle arrangements generate a new peripheral vertical and horizontal flow (pvhF) platform that further by adding deflecting means related to the flow over the skimming floater generate the peripheral, rotating vertical and horizontal flow platform (prvhF) and further the new centrifugal collecting flow pattern (ccF). Thereby is accomplished new embodiments that stepwise, in right orders, without disturbing each other's functions, optimize the conditions for effective gravimetric and centrifugal purification and transportation of liquids and/or solids floating on a water level to e.g. a storage tank or storage bag.

This is a short, non-exhaustive, list of purifying steps that is accomplished by the embodiments disclosed herein:

1. To remove rough solid floating pollutants in a rough separation step.
2. To generate rotating forces to facilitate transportation and aggregation of pollutants inside the separator.
3. To prevent that larger floating debris does not enter into the main separating compartment.
4. To create a slow horizontal rotating flow that all over its area can be used to generate an even vertical flow during the separating period, e.g. controlled by the rotational speed of a propeller.
5. To remove solid pollutants with irregular shapes and large thin areas, such as leaves, thin plastic sheets, etc.
6. To create optimal functions for non-clogging coalescent filters.
7. To optimize the gravimetric and centrifugal separation to such an extent that e.g. activated carbon filters may be used to further improve the water quality.
8. To create an emptying and transportation process that may be a part of a closed or open loop between the separator and its external storage tanks/floating bag in relation to its surrounding water.

According to a first aspect of the present invention a skimming and separation device is defined that in particular includes at least one peripheral flow deflecting member arranged in relation to the floater and structured to achieve a rotational movement of the downward directed flow of water and debris, in a horizontal plane and along a vertical longitudinal center axis of the skimming and separation device. More particularly, the peripheral flow deflecting member is arranged essentially below an inner periphery of the floater, and structured to achieve the rotational movement of the downward directed flow of water and debris around the entire inner periphery of the separator.

According to a second aspect the skimming and separation device comprises a baffle unit (vb) to be arranged within said compartment (2) being floating and/or being attached to the floater (5) or to the outer casing (1b), and structured to divide said compartment into a skimming and concentrating compartment (sC), and into an open collecting area/volume (Dz).

According to a third aspect the skimming and separation device comprises a basket (B) to be arranged within said compartment (2), wherein said basket comprises a floating circular ring (cr) defining an upper border of the basket and having a certain vertical height that is configured to prevent collected liquid and debris to pass the borders of the basket, and that the rest of the basket is structured to be arranged within a main separating area/volume of the device and is made from a net or another suitable configuration, structured to allow free motions of collected debris into the collecting and discharge volume (DZ) of the basket.

In particular the device applies the known peripheral vertical flow platform (pvF) where the angled endings of the tubes (15) provided with certain arrangements and an open collecting and discharge volume (DZ) can create the new centrifugal collecting flow pattern (ccF).

According to an embodiment of the present invention a baffle arrangement provided inside the skimming floater will generate a peripheral vertical and horizontal flow (pvhF) platform According to another embodiment the new peripheral vertical flow (pvhF) platform is further featured by a deflection member that will generate the new peripheral, rotating vertical and horizontal flow platform (prvhF) and the new centrifugal collecting flow pattern (ccF).

SHORT DESCRIPTION OF THE APPENDED DRAWINGS

FIGS. 1a-1c illustrates cross-sectional views of a known skimming and separation device, working according to the central vertical flow technology platform (cvF).

Figure 12A:
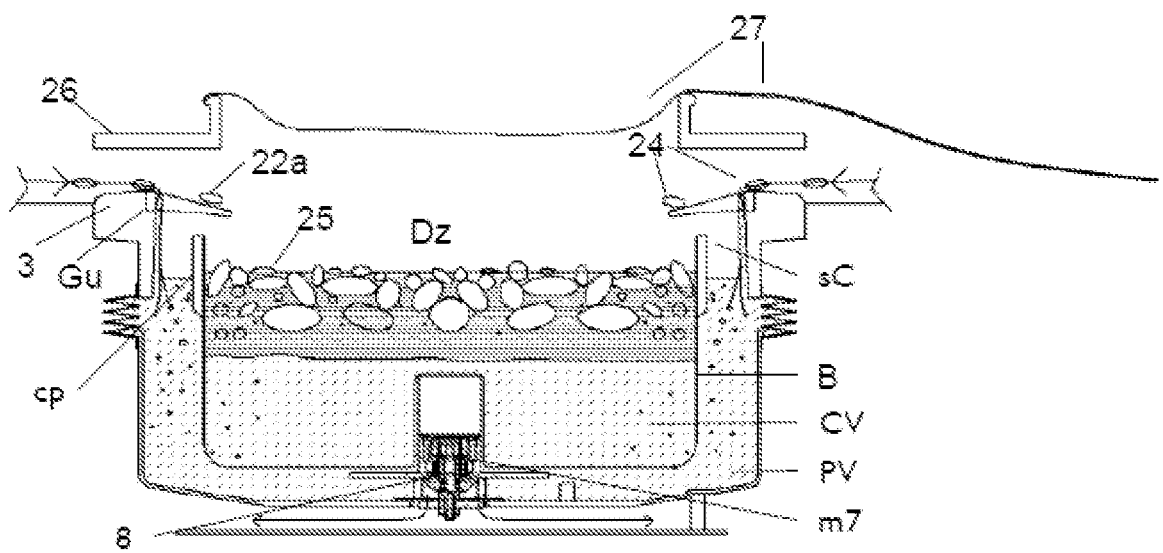
Figure 12B:
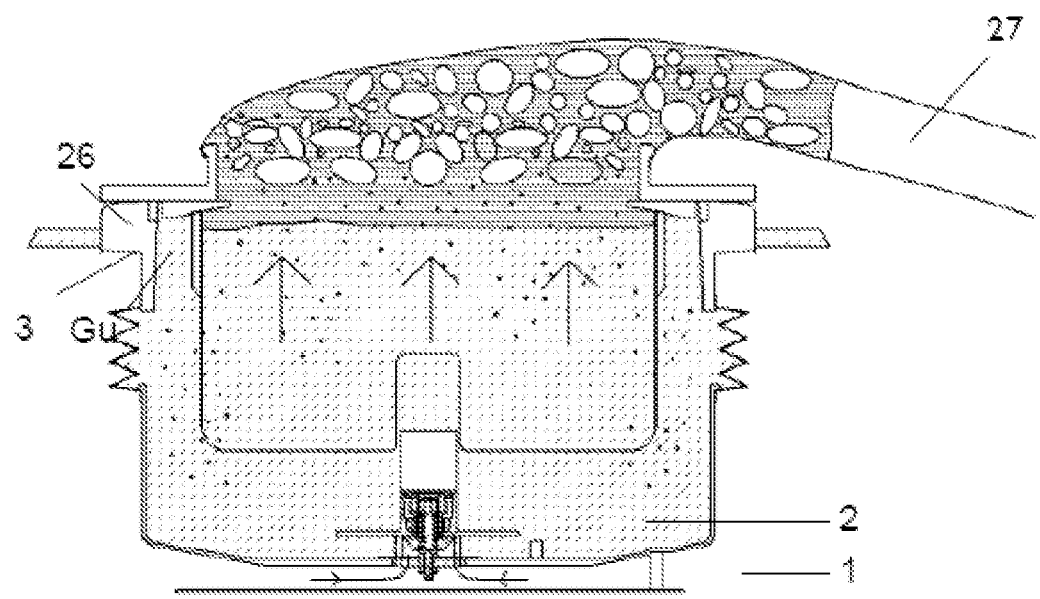

FIGS. 12a-b illustrates cross-sectional views of embodiments of the skimming and separation devices according to the (pvhF) platform in accordance with the present invention.

Figure 12C:
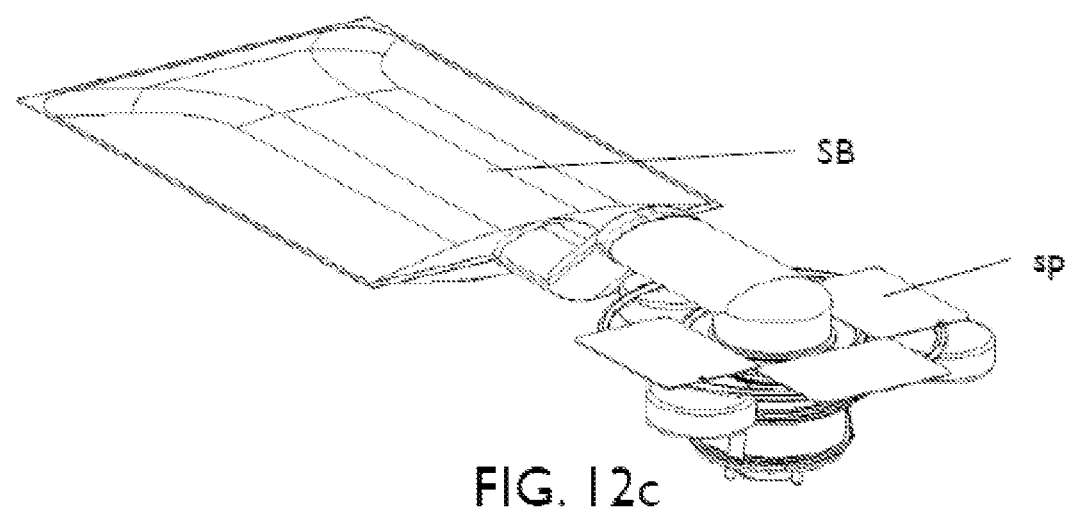

FIG. 12c is a perspective view of another embodiment of the skimming and separation device with possibilities of a closed or open loop between the separator and its external storage tanks/floating bag in relation to its surrounding water according to the present invention.

Figure 13A:
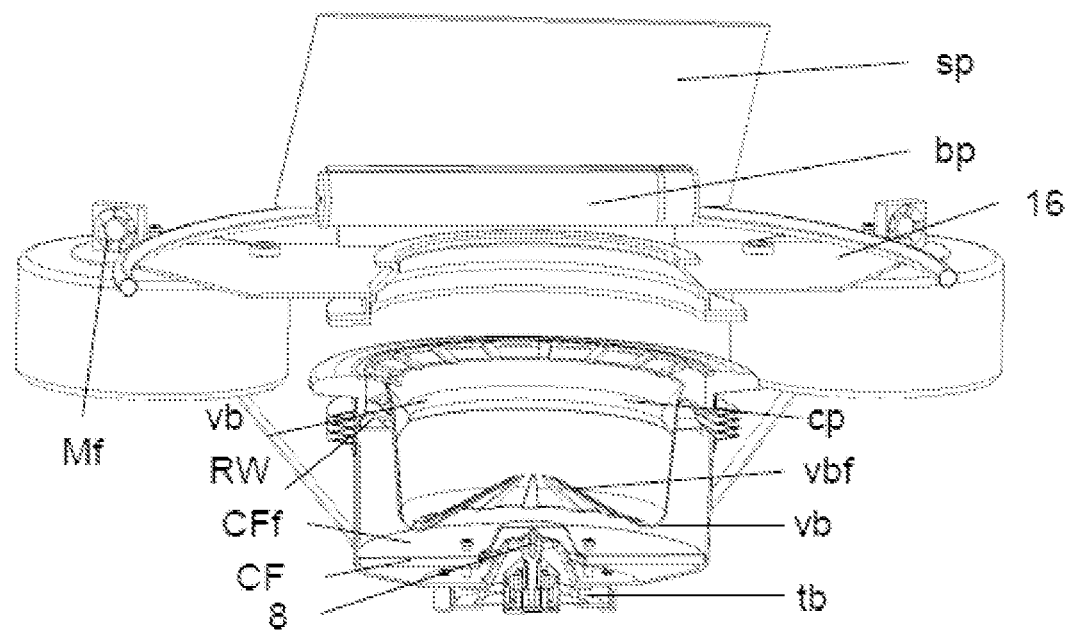

FIG. 13a is a cross-sectional view of embodiments of the skimming and separation devices according to the (prvhF) platform and (ccf) platform in accordance with the present invention.

Figure 13B:
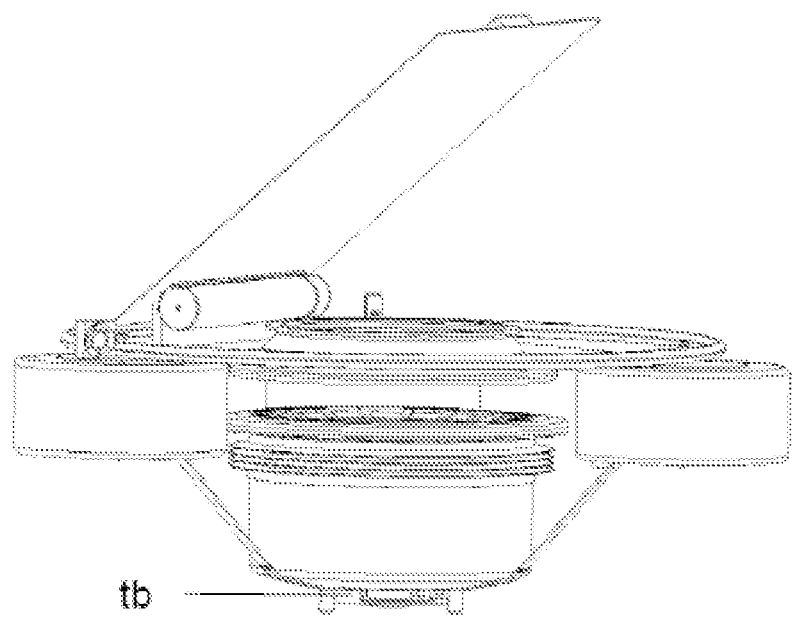

FIG. 13b,c are perspective views of the skimming and separation devices according to the (prvhF) platform and (ccf) pattern in accordance with the present invention.

FIGS. 14a-14e are perspective views of an embodiment of the skimming and separation device of e.g. a large offshore unit working according to (pvF), and (ccF) platforms in accordance with the present invention.

DETAILED DESCRIPTION OF PREFERRED EMBODIMENTS OF THE INVENTION

The skimming and separation device will now be described in detail with references to the appended figures. Throughout the figures the same, or similar, items have the same reference signs. Moreover, the items and the figures are not necessarily to scale, emphasis instead being placed upon illustrating the principles of the invention.

In order to fully appreciate the present invention in relation to the known prior art devices, these will be described with references to FIGS. 1-3.

Thus, FIGS. 1a and b illustrate a known skimming and separation device being in a collecting phase and working in accordance to the basic central vertical flow pattern (cvF). The device comprises an outer assembled casing 1 provided with constructions to which parts are directly or indirectly attached, including floaters (not shown). The outer casing 1 defines an external wall of a compartment 2 that is used for separation and accumulation of debris.

A floater 5 is provided being configured to create the skimming weir of the device. The floater is attached at its lower side to an essentially vertically arranged bellow 4 with a flat part towards the casing 1 allowing the floater to move from a neutral position (not shown) in which position essentially no flow will enter into the device, to a lower position which is illustrated in FIGS. 1a and 1b. In this position, a flow of water and debris (wd) will follow the contours of the floater 5 and flow downwards to the water level 9 in the skimming compartment (sC). The water level 9 is determined by the speed of the propeller 8, the floating forces of the floater 5 and by the force gradients acting on the bellow 4 in relation to the water level 9 in the skimming compartment (sC) and the outside water level (wd).

The layer of pollutants will during the collecting phase (see FIGS. 1a and 1b), by sliding over the skimming edge, gain energy and generate radial forces that will compress and increase the thickness of the pollutant layer on top of the surface layer 9 in the skimming compartment (sC). The flow of water through the water level 9 in the skimming compartment (sC) generate turbulences that forms drops of e.g. oil and/or foam that with an appropriate flow rate will after passing the valve function (vf2) be transported through the central tube (c) into the separation and collecting compartment 2 that during the collecting phase is closed to the atmospheric pressure by the valve function (vf1) generated by the flat area of the bellow 4.

After passing the valve function (vf2), which prevents back flow during the ejection phase (illustrated in FIG. 1c), the flow of water and pollutions will enter the compartment 2 through the vertical center tube (c). The flow will, by the function of several baffles 2a, 2b, 2c arranged to reduce stream lines, and then display a horizontally expanding flow pattern that rapidly decreases the horizontal flow rate allowing the pollutants to diverge on to the top of the closed compartment 2. The flow of purified water will pass the peripheral edge of the large baffle 2a (see arrow in FIG. 1b) and further out of the compartment 2 by means of the propeller 8 driven by the motor 7.

Figure 1C:
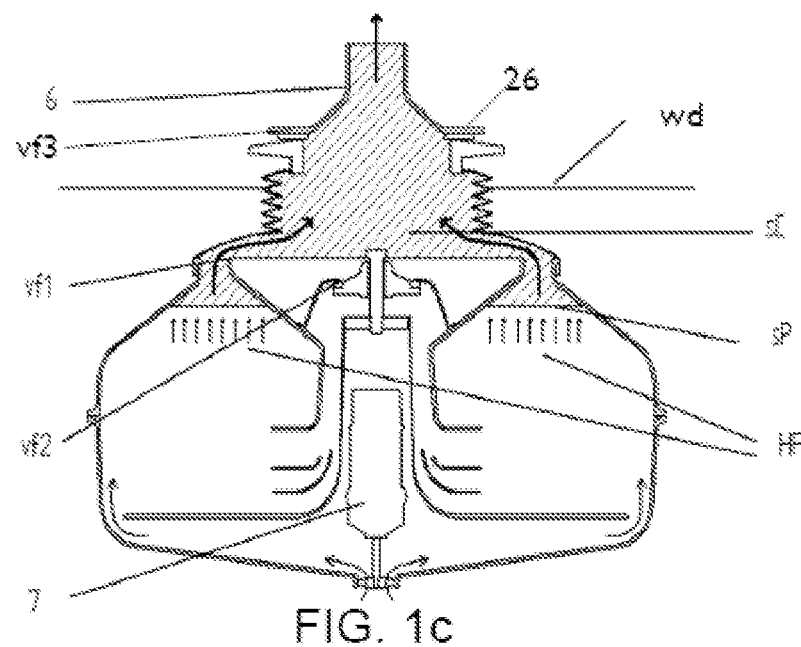

FIG. 1c illustrates the device being in an emptying phase. The propeller 8 is now rotating in the other direction filling the compartment 2 with water and thus increasing the pressure to become higher than the atmospheric pressure. The valve vf2 will close and the valve vf1 will open. The floating forces of the floater 5 and the force gradients acting on the bellow 4 in relation to the water level (wd) and the water level 9 in the skimming compartment (sC) will now generate forces that will push the floater towards the lid 26 and create a third valve function (vf3) to direct the collected pollutants through the skimming compartment (sC) into an output tube 6 for further transportations to a storage compartment (not shown).

Figure 2A:
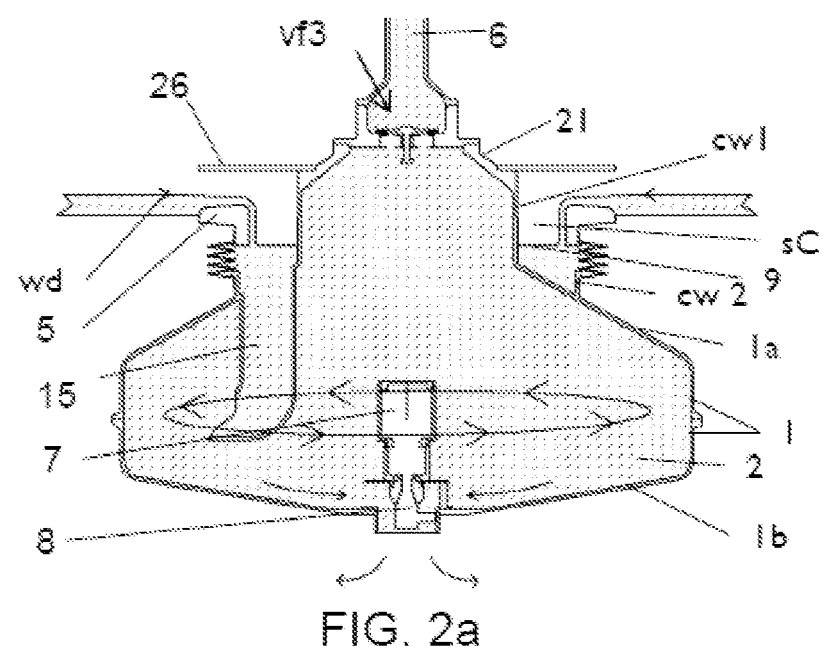
FIGS. 2a-2c illustrates various views of a known skimming and separation device, working according to the peripheral vertical flow technology platform (pvF).
Figure 2B:
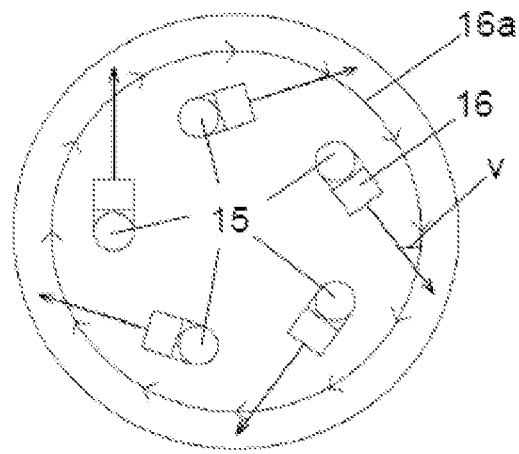

FIGS. 2a and 2b illustrates a known skimming and separation device being in a collecting phase and working in accordance to the basic peripheral vertical flow pattern (pvF).

In general the skimming and separation device consists of an outer casing 1 that makes it possible to directly or indirectly fasten all the other parts.

In FIG. 2a is illustrated an outer casing 1 that is an external wall of a closed compartment 2 used for separation and collection of debris. The casing 1 is provided with a number of tubes 15 entering into the closed compartment 2, which is divided into at least two parts, an upper casing part 1a and a lower casing part 1b. A floater 5 with a bellow 4, without a flat part as described in FIG. 1, is attached to the upper casing part 1a via a circular wall (cw2). These structures surround the upper closed volume of the compartment 2 being a part of the internal storage volume above the angled ending of the tubes 15 of the device (see FIG. 2c) and define a toroid shaped skimming compartment (sC) around the circular wall (cw1) being a part of the upper casing part 1a.

Figure 2C:
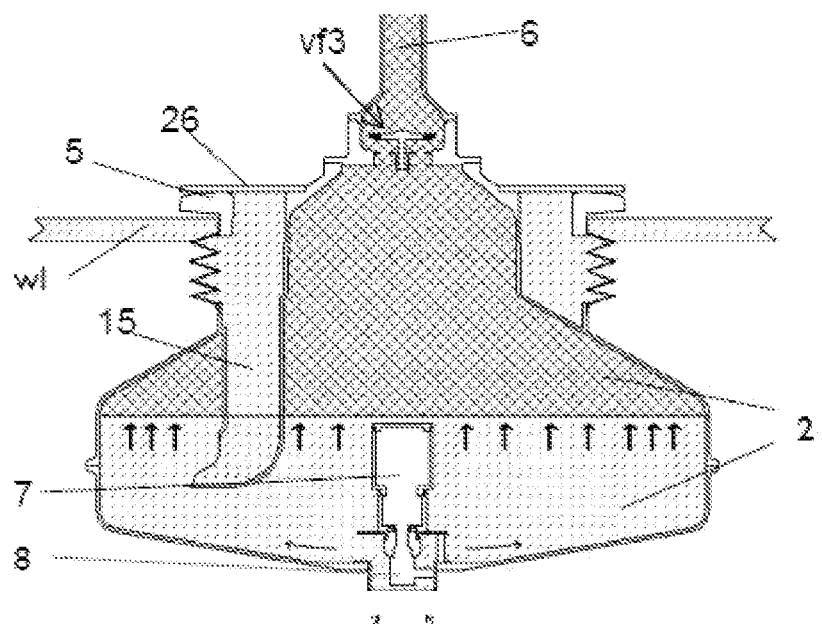

The outflow tract 21 of the compartment 2 is provided with a valve (vf3) that prevents backflow of pollutants and air entering into the compartment 2 during the collecting phase of the device illustrated in FIG. 2a, and opens during the discharge phase illustrated in FIG. 2c.

The floater is attached at its lower side to an essentially vertically arranged bellow 4 allowing the floater to move from a neutral position (not shown) in which position essentially no flow will enter into the device, to a lower position which is illustrated in FIG. 2a. In this position the water level (wd) with water and debris will follow the contours of the floater 5 and flow downwards to the water level 9 in the skimming compartment (sC). The water level 9 is determined by the speed of the propeller 8, the floating forces of the floater 5 and by the force gradients acting on the bellow 4 in relation to the water level (w1) and the water level 9 in the skimming compartment (sC).

The layer of pollutants will during the collecting phase (see FIG. 2a), by sliding over the skimming edge, gain energy and generate radial forces that will compress and increase the thickness of the pollutant layer on top of the surface layer 9 in the skimming compartment (sC). The flow of water through the water level 9 in the skimming compartment (sC) will generate turbulences that, as being described in relation to the central vertical flow pattern (cvF, FIG. 1), forms drops of e.g. oil and/or foam that, with an appropriate flow rate, will generate, after passing the angled endings of the tubes 15, a slow spinning of the fluid inside the compartment 2.

The area of the skimming compartment (sC) is determined according to the decided flow through the separator device and also in dependence of the diameters of the tubes 15 such that they do not clog.

FIG. 2b discloses a cross-sectional view from above through the lower part of the separation device illustrated in FIG. 2a where the transportation tubes 15 comprise an angled lower tube part, a deflection unit 16 configured to direct the liquid flow of the tubes in an essentially horizontal outward direction inside the compartment 2 such that the direction of the liquid flow is in an oblique direction in relation to the external vertical wall of the casing 1. All deflection units 16, e.g. five, are arranged at essentially the same angle (v) in relation to the wall, e.g. in a direction that is in the range of 20-60 degrees to the separator wall, thereby the liquid flow from all tubes will together generate a rotational movement of water and pollutants illustrated by the arrows 16a within the separation compartment 2.

The angled tubes will generate a slow rotation of the water and pollutants in the closed compartment 2 that effectively reduces the risk of streamers and further results in that the whole area of the compartment 2 can be used to create an even vertical flow towards the outlet through the propeller 8 that is lower than the gravitational motions of the pollutants towards the closed compartment 2.

The vertical flow is set by the rotational speed of the propeller 8. If the densities of the pollutants are close to that of the water and/or the pollutants are solids of irregular shapes the vertical speed has to be set very low. This will to a large extent decrease the separating capacity of the device.

The angled tubes need some extra space both in diameter and height of the compartment 2 in order to generate the smooth vertical movement over the whole separating area of the compartment 2.

FIG. 2c discloses a discharge phase of the skimming and separation device according to the basic peripheral vertical flow pattern (pvF). A reversed rotation of the propeller 8 increases the pressure in the compartment 2 resulting in that the floater 5 will be forced towards the lid 26 and shut off backflow over the peripheral tubes 15 that further results in that the valve function (vf3) opens and flow of accumulated debris can be forced through the outlet 6 into a suitable storage tank (not shown).

Figure 3A:
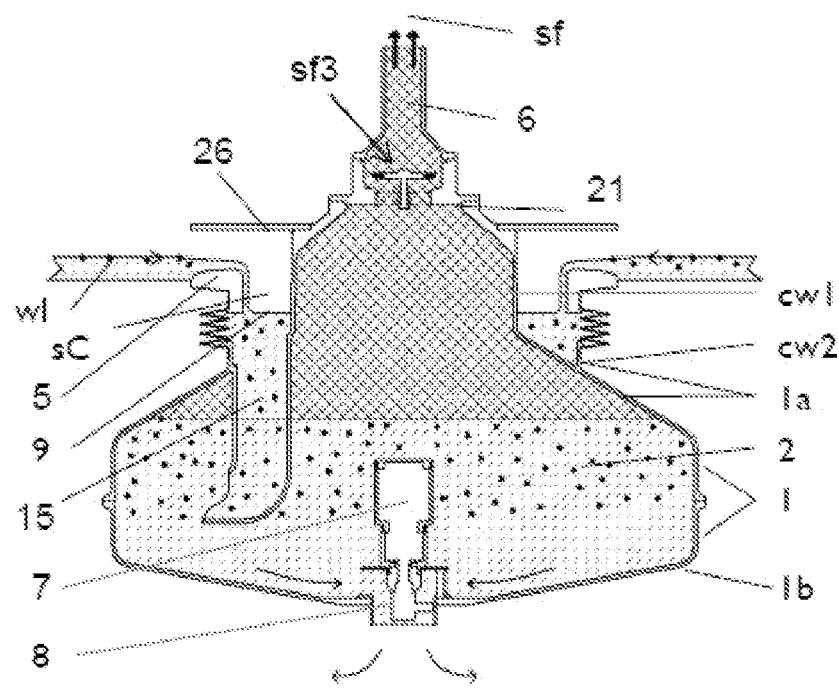
FIGS. 3a and 3b illustrate cross-sectional views of a known skimming and separation device, working according to the peripheral vertical flow technology platform (pvF).
Figure 3B:
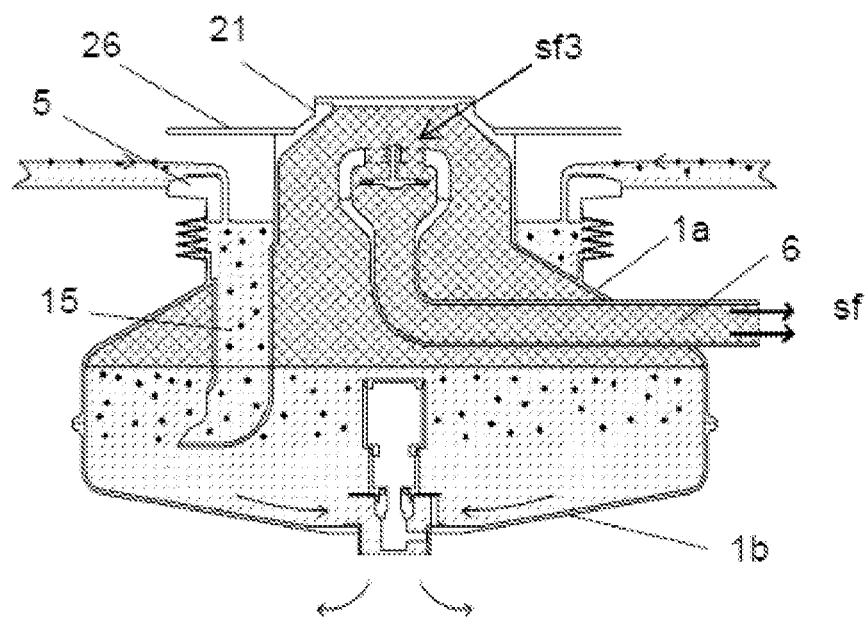

Furthermore, in FIGS. 3a and 3b is illustrated two known variations to create a continuous removal of collected debris in a skimming and separating device according to peripheral vertical flow pattern (pvF) by adding externally generated suction forces (sf) to the volume of the collected pollutants through the outlet 6. The externally generated suction forces will besides transportation of debris to a suitable vacuum tank also have impact onto the pressure inside the compartment 2 and thus also have impacts on the skimming and separating functions of the device. The reference signs of FIGS. 3a and 3b designate the same or similar items as in FIGS. 2a-2c.

By applying known and new concepts, adaptive separating steps are presented in order to optimize the conditions for effective gravimetric purification and accumulation of pollutants, with or without filtrations. An effective suitable transportation of collected pollutants, such as liquid, foam, algae and/or solids, to a storage tank or e.g. a floating storage bag (CB) are thereby achieved, which transportation is adapted to be a part of an open or closed loop to the surroundings.

This has been accomplished by:
1. Using the known peripheral vertical flow (pvF) platform with its horizontal flow in combination with a new open collecting and discharge zone further can be connected to the new centrifugal collecting flow platform (ccF).
2. Adding baffle arrangements that divides the separator into a peripheral inflow channel and a central collecting and discharge zone, a new peripheral vertical and horizontal flow (pvhF) platform is achieved.
3. Adding deflecting means related to the flow over the skimming floater and the peripheral inflow channel generate the peripheral, rotating vertical and horizontal flow platform (prvhF) and further the new centrifugal collecting flow platform (ccF).

Various different embodiments of the present invention will be discussed in detail in the following. These embodiments disclose various aspects of the skimming and separation device where flows into the device are generated by negative pressure inside the device. Collected debris may by use of passive forces, overpressures inside the device and/or suction forces be transferred into external collecting units such as storage tanks or storage bags.

In FIGS. 4-8 and 14a,b and e, are disclosed various embodiments according to the invention that are related to peripheral vertical flow (pvF) technology platform with an open access to the internal collecting compartments of the skimming and separation devices.

Figure 9A:
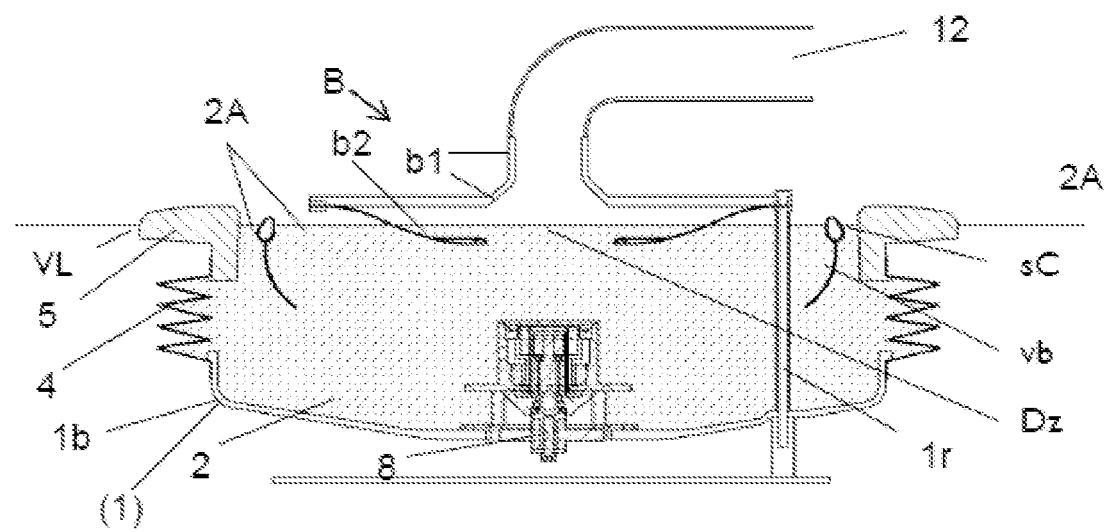
FIGS. 9a-9b illustrates cross-sectional views of embodiments of the skimming and separation device including transportation of collected pollutants according to the (pvhF) platform.

In FIGS. 9a,b, 10a, 11, 12, 14c are disclosed various embodiments according to the invention related to the (pvhF) platform.

Figure 10A:
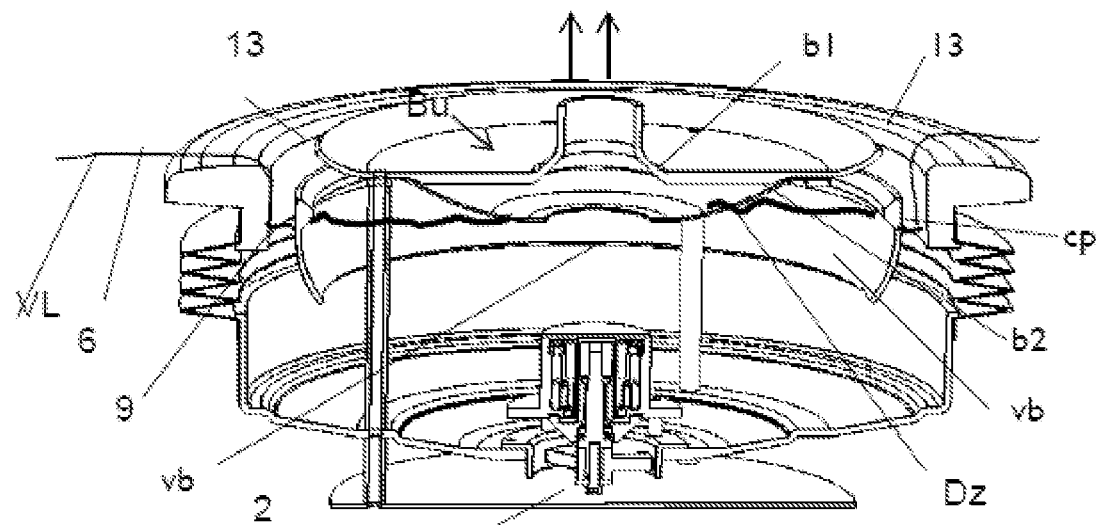
FIG. 10a is a cross-sectional perspective view of an embodiment of the skimming and separation device according to the (pvhF) platform in accordance with present invention.
Figure 10B:
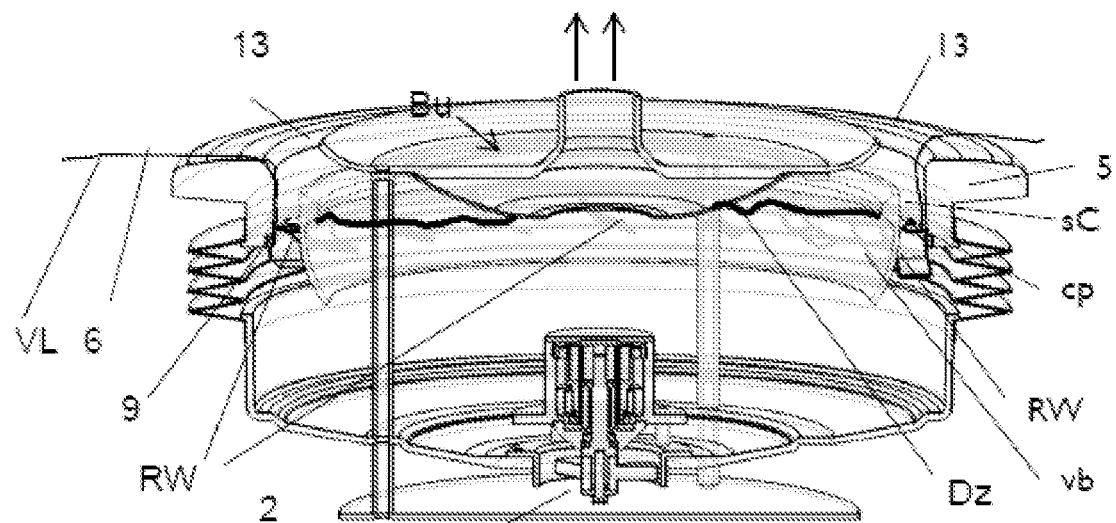
FIGS. 10b-10c illustrates cross-sectional perspective views of embodiments of the of the skimming and separation device according to the (prvhF) platform and (ccF) flow pattern in accordance with the present invention

In FIGS. 10b,c, 13, 14d the (pvhF) platform is disclosed converted into the new peripheral rotating vertical and horizontal flow (prvhF) platform and the (ccF) platform by adding the ring with a plurality of wings (RW) into the peripheral inflow channel of the devices.

Firstly, the skimming and separation device according to the present invention, and some embodiments, will be generally described, thereafter a detailed description of the embodiments illustrated in the figures will follow.

Thus, a skimming and separation device is provided, comprising an outer casing 1 provided with constructions to directly or indirectly fasten all parts, defining an open compartment 2. A floater 5 is arranged configured to create the skimming function of the device, and the floater is attached at its lower side to an essentially vertically arranged bellow 4 allowing the floater to adapt flow into a substantially circum volume and allowing the floater to move from an upper position with essentially no flow into the compartment 2 to a lower position allowing flow of water and debris follow the contours of the floater 3 in a downward direction into the device. A power device 8 with a propeller 7 is arranged at a lower part of the device, wherein the power device is configured to be controlled by a control unit such that various kinds of flows and pressures may be generated to control the in-flow and outflow of the device. The skimming and separation device comprises at least one peripheral flow deflecting member (RW), in order to accomplish the (prvhF) and (ccF) platforms, arranged in relation to the floater, see FIGS. 10b,c, 13, 14d. The peripheral flow deflecting member is structured to achieve a rotational movement of the downward directed flow of water and debris, in a horizontal plane and around a vertical longitudinal center axis of the skimming and separation device. The peripheral flow deflecting member is arranged essentially below an inner periphery the floater, and structured to achieve the rotational movement of the downward directed flow of water and debris essentially along the entire inner periphery of said floater.

Figure 9B:
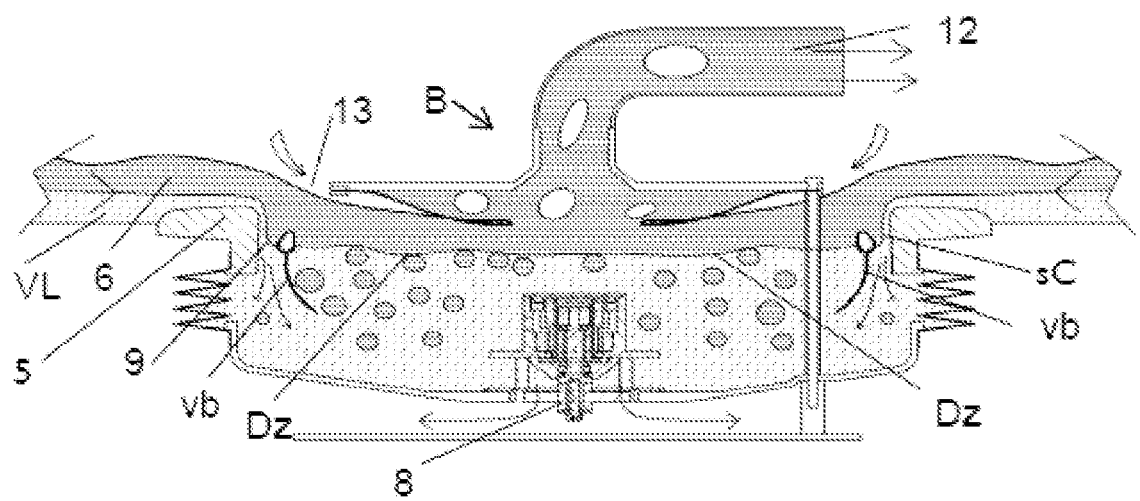
Figure 9C:
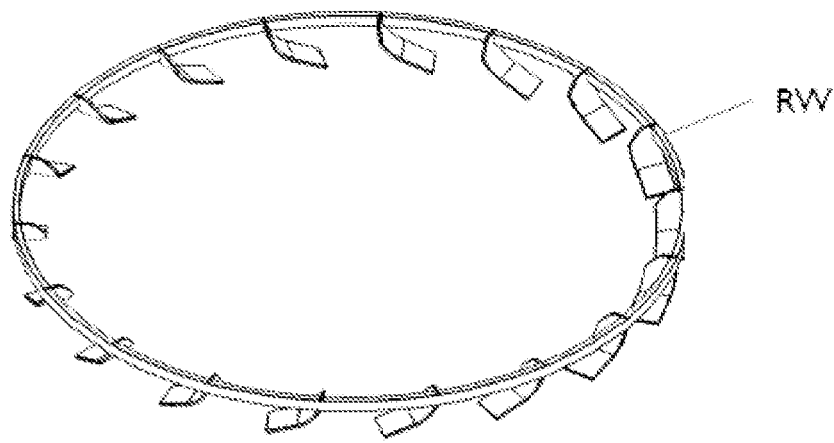
FIG. 9c is a perspective view of an embodiment of a deflecting flow member that will generate the new peripheral rotating vertical and horizontal platform (prvhF) and the new centrifugal collecting flow pattern (ccF) in accordance with the present invention.
Figure 10C:
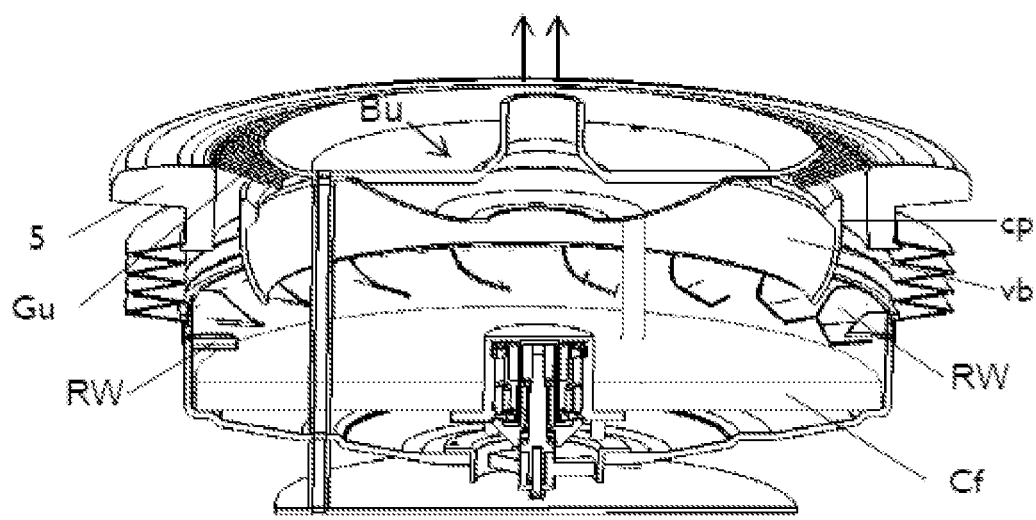
Figure 13C:
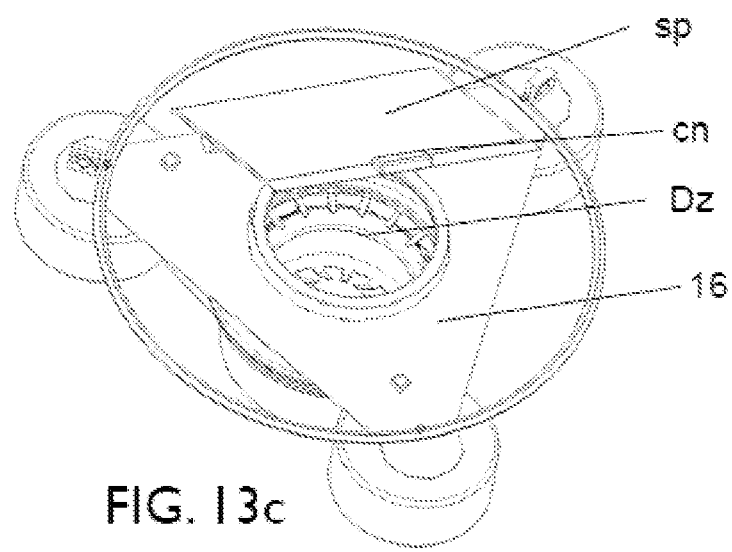
Figure 14A:
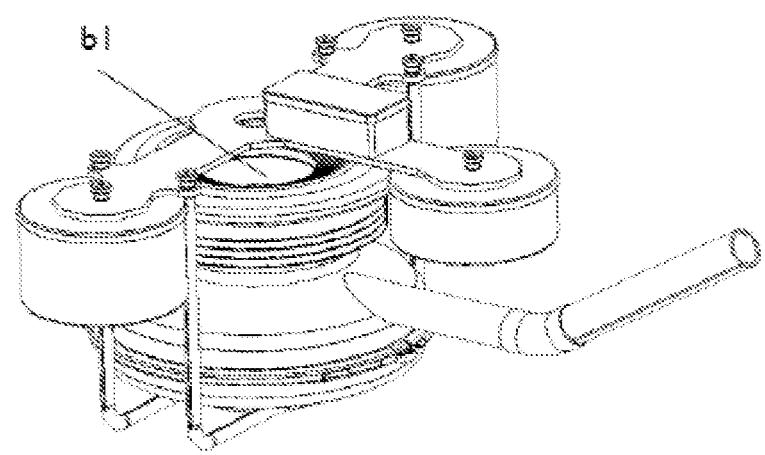
Figure 14B:
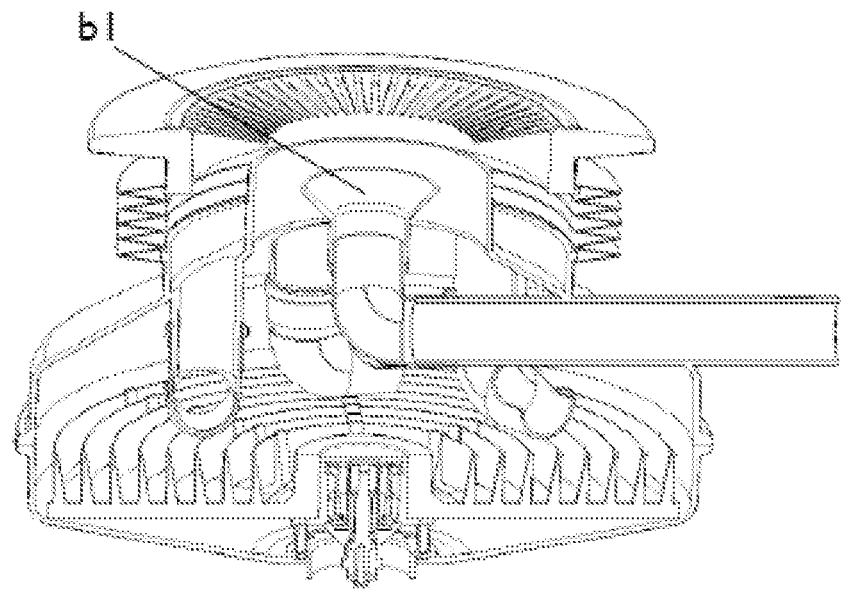
Figure 14C:
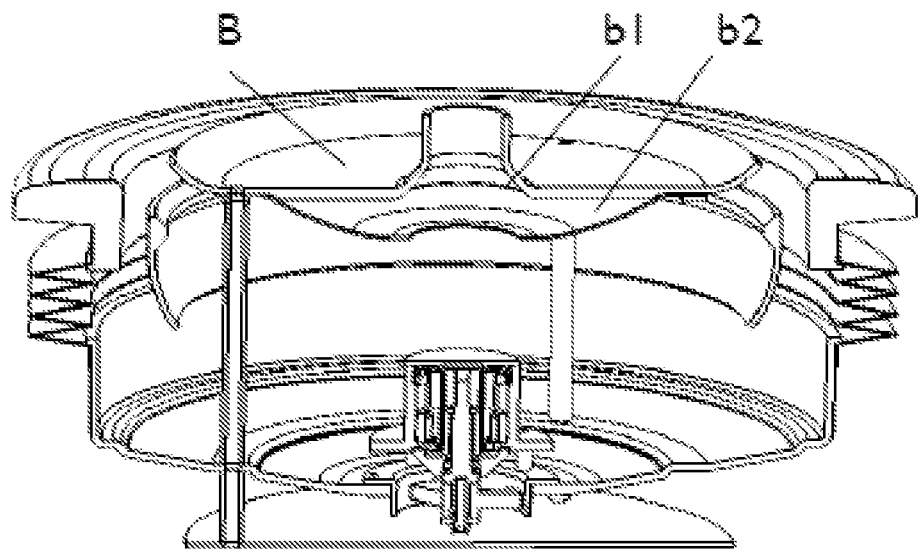
Figure 14D:
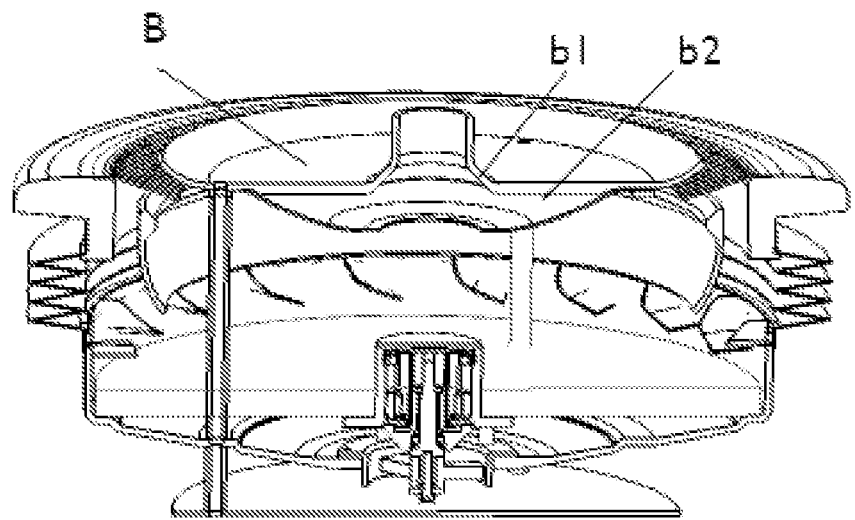

As illustrated in FIG. 9c the peripheral flow deflecting member comprises a ring provided with flow deflecting wings (RW) and configured to be attached to the floater 5 (see FIGS. 10b and 13a-c) and/or to the casing close to the bellow 4 (see FIGS. 10c and 14d).

In FIGS. 9-13, 14c,d baffle units (vb) are introduced being a first step of separating the skimming compartment (sC) and the main separating compartment (2) from the collecting and discharge zone (Dz). These embodiments may further, according to the invention, by adding the ring with a plurality of wings (RW) into the peripheral inflow channel, generate the (prvhF) and (ccF) platform.

The baffle unit (vb) is arranged within the skimming and separating compartments and is in most of the embodiments a floating baffle unit. In some embodiment the baffle unit (vb) may have shapes like a basket (B) wherein said basket or baffle unit comprises a floating circular ring (cr) defining an upper border of the basket and having a certain vertical height that is configured to prevent collected liquid and debris to pass the borders of the basket (see e.g. FIG. 12a) and that the rest of the basket is structured to be arranged within a main separating area/volume of the device and is made from a net structured to allow free motions of collected liquid debris to enter into the collecting and discharge zone (Dz).

Figure 4A:
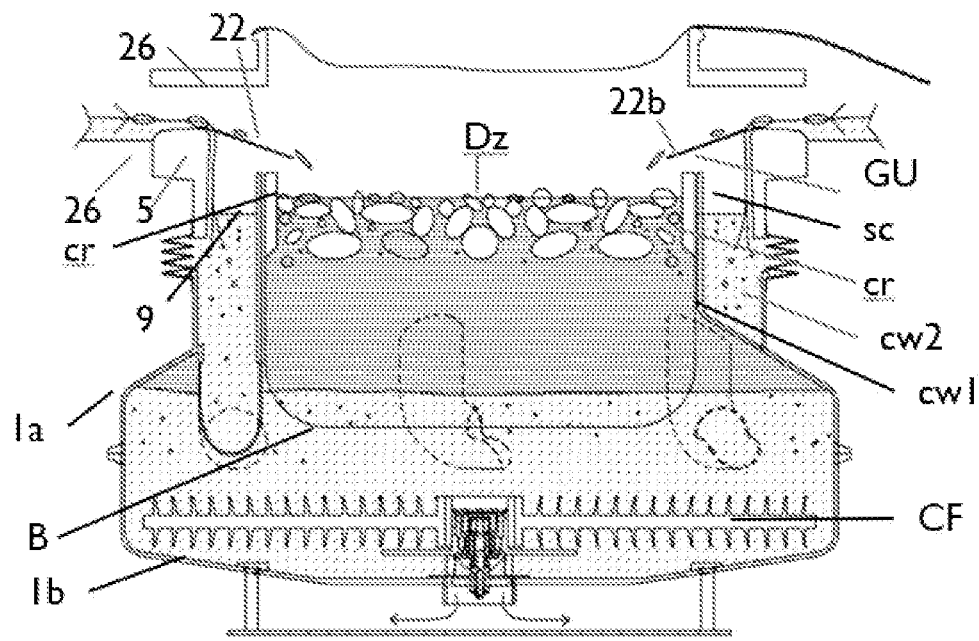
FIGS. 4a-4d illustrates various views of embodiments of the skimming and separation device according to the present invention, working according to (pvF), and (ccF).
Figure 6A:
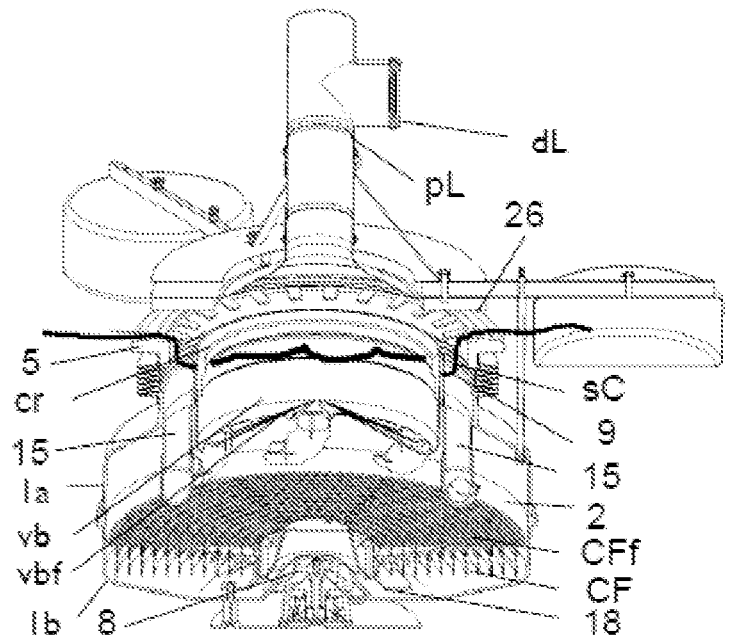
FIGS. 6a and 6b illustrates other views of further embodiments of the skimming and separation device according to the present invention.

In another embodiment the device comprises an essentially planar and disc-shaped coalescent filter (CF) that is arranged in a horizontal plane in the lower part of the compartment 2 (see e.g. FIGS. 4a,b, 5a-5c, that further in e.g. FIG. 6a,b are supplied with a thin net (CFf) to avoid that e.g. leaves and thin plastic sheets are getting stacked to the coalescent filter during the (ccF) collecting process.

In still another embodiment the device comprises a guiding unit (Gu) structured to be horizontally arranged along said floater 3. The guiding unit is provided with inwardly directed guiding fingers structured to guide solid debris directly to the collecting and discharge zone (Dz) (see FIGS. 4a, 4c, 5, 6, 10c, 11, 12, 13, 14).

In one embodiment, the skimming and separating device comprises a basket like baffle unit (vb) to be arranged within the compartment, wherein said basket comprises a floating circular ring (cr) defining an upper border of the basket and having a certain vertical height that is configured to prevent collected liquid and debris to pass the borders of the basket (see FIG. 13a-c). The rest of the basket is structured to be arranged within a main separating area/volume having a deflection area that can end up with fingerlike protrusions (vbf) to prevent that larger directly collected solid pollutants in the discharge zone can enter into the main separating area. The basket like baffle unit can still allow debris like leaves and thin plastic sheets that have entered into the main separating area to enter into the collecting and discharge zone (Dz).

The skimming and separation device preferably comprises a control unit that is configured to receive measurement signals from various items of the devices, and is powered by e.g. a solar panel (sp) and/or a battery pack (pp), see FIGS. 13a-c. The control unit is configured to indicate the power consumption of the power device (8) and if the power consumption is above a predetermined threshold the rotational speed of the propeller is varied and/or the rotational direction is altered according to preset control rules.

The control rules comprise a rule including control instructions to continuously and repetitively increase and then decrease the rotational speed and to alter the rotational direction.

Now the various embodiments will be further discussed in relation to the figures.

FIG. 4a illustrates a cross-sectional view of the skimming and separation device according to one embodiment, where the device is in a collecting phase. The device according to this embodiment is provided with means that will accomplish flow patterns that step-wise in right orders without disturbing each other functions to optimize the conditions for effective gravimetric and centrifugal purification and transportation of floating liquids and/or solids on a water level to e.g. a storage tank or storage bag (SB).

As being described in relation to FIGS. 2a and 2b the casing 1 is an assembly of at least two parts 1a, 1b creating a compartment 2 that in this embodiment has a wide open central discharge area/volume (Dz) to the water level and/or to the atmospheric free space and pressure. The compartment 2 is the main compartment for gravimetric and centrifugal separations and internal storage of collected pollutants.

A floater 5 is attached to a vertically oriented bellow 4 that in turn is attached to a circular wall (cw2) being a part of the casing 1. The floater in combination with the bellow is configured to create the skimming function of the device and also to create the peripheral border of a toroid shaped skimming and concentrating compartment (sC). Its central border is delimited by a circular and essentially vertical wall (cw1) of a part of the upper casing (1a) that also is the peripheral border of the central open area/volume (Dz) being a part of the compartment 2.

The floater 5 is also provided with a guiding unit (Gu) having fingerlike protrusions 22. A top view of the guiding unit is illustrated in FIG. 4c. The guiding unit (Gu) will transfer most of the solid pollutants carried by the water on to the top of the central area (Dz) that in this embodiment is in direct contact to the open air pressure. This area is separated from the skimming compartment (sC) by the circular wall (cw1) and in this embodiment also by a basket (B).

Inside the circular wall (cw1) a floating basket like unit (B) may be inserted. This basket like unit will also be referred to as a vertical baffle unit (vb), see e.g. FIG. 9a, since its construction is very similar to what is needed to generate the (pvhF) and (prvhF) platforms. In these embodiments the baffle unit (vb) serves two main functions. Firstly, it serves as a barrier between collected liquid and solid pollutants, and secondly, it divides the separator into a peripheral inflow channel and a central collecting and discharge zone. Its shape and lower end construction serves as a transformer of the rotating forces generated by these platforms to generate an effective collecting flow platform (ccF). The vertical baffle unit (vb) can be easily changed to serve different kinds of custom demands. Preferably, the basket (B), the vertical baffle unit (vb) is provided with a circular floating ring (cr) having a certain vertical height that can prevent liquid collected debris to pass the borders of the basket, meanwhile the rest of the basket that being in the main separating area/volume (2) of the device can be made of a net or other constructions that to allow free motions of collected liquid debris to enter into the discharge zone. The whole baffle unit can be made in polymeric material that has a lower density than water.

During the collecting phase illustrated in FIG. 4a the central area (Dz) is open to atmospheric pressure and space. Furthermore, during the collecting phase this area is below the skimming edge but at the same or higher level than the skimming and concentrating level 9. More assembled pollutants will increase the level of (Dz). The floating basket (B), or baffle unit (vb) is in this embodiment applied where the vertical circular wall (cw1) as a stationary wall that together with the floating basket (B), or baffle unit (vb) will set the internal borderline and height for the skimming and concentrating compartment (sC).

Thus, inside the circular wall (cw1) the floating basket (B) or the vertical baffle unit (vb) is inserted. The basket will be filled from its top to its bottom with rough solid pollutants without disturbing but just improving the conditions for a progressive effective gravimetric and centrifugal purification of smaller floating particles and oil contaminations.

Almost all small to micro-sized floating pollutants like proteins including liquids like oil, together with the major part of the water, will enter into the skimming toroid-shaped open compartment (sC). The layers of these pollutants, after passing the fingerlike protrusions 22 during its sliding over the skimming edge, will gain energy and generate radial forces and will, by adding the ring with a plurality of wings (RW), (see FIG. 9c), also generate centrifugal forces that will compress and increase the thickness of the pollutant layers on top of the water level 9 in the skimming compartment (sC).

Figure 5A:
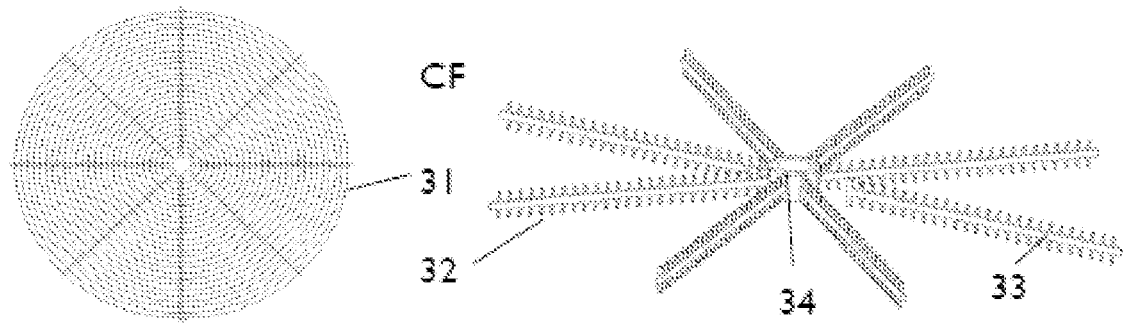
FIG. 5a illustrates a low resistance coalescence filter.

The flow of water through the skimming compartment (sC) will generate turbulences that form drops of e.g. oil and proteins that with an appropriate flow rate will be transported through the peripheral vertical tubes 15 according to flow pattern (pvP) into the separation and collecting compartment 2. The angled tubes (16) will generate a slow rotation of the water and pollutants in the compartment 2 that effectively reduces the risk of streamers. It further results in that the whole area of the compartment 2 may be used to create an even vertical flow towards the outlet through the opening of propeller 8. The vertical flow is set by the rotational speed of the propeller. To further improve the cleaning process a coalescent filter (CF) may be arranged. The coalescent filter described in FIG. 5a is essentially planar and disc-shaped and is arranged in a horizontal plane in the lower part of the compartment 2.

Figure 4B:
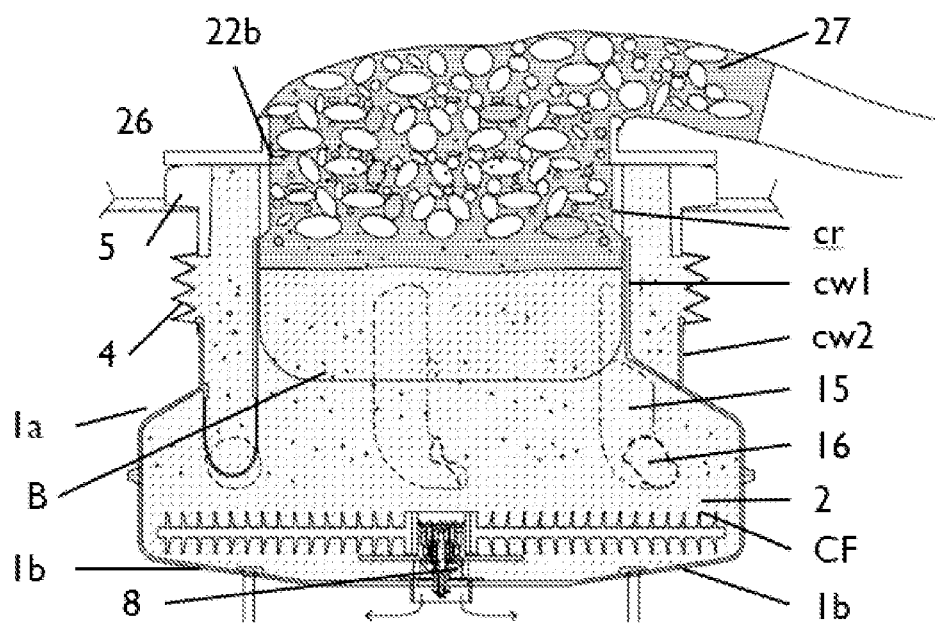
Figure 4C:
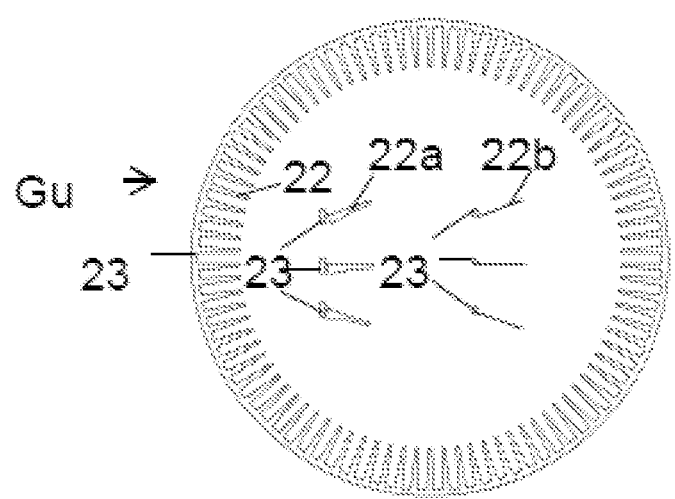

FIG. 4b is showing a cross-sectional view of the device during an emptying phase. The motor 8 is reversed which will result in that the floater 5 will close against the lid 26. That will also happen with the floating basket (B) sliding against the center wall (cw1). That means that skimming compartment (sC) will be sealed off from the atmospheric pressure and thus more or less prevent back flow over the peripheral vertical tubes 15. This means that most of water flow and pressure that is generated by the propeller including all the collected pollutants outside the basket will be forced through the net or lamellas of the basket. The openings or lamellas of the basket that can be made to increase their openings during the backflow are larger than the openings between the fingerlike protrusions 22 in the guiding unit (gu) further being described in FIG. 4c.

Figure 4D:
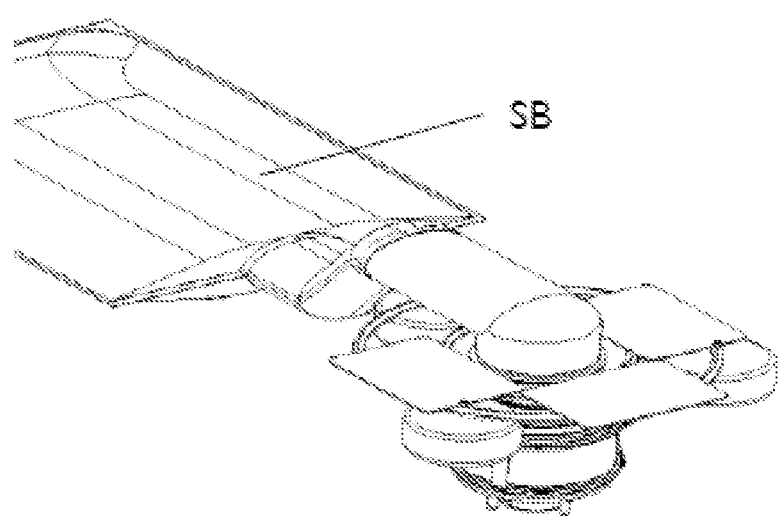

This will clean the basket from the solid pollutants and push all collected solids and oil into a suitable prepared floating storage bag (SB), which is illustrated in FIG. 4d.

The valve function of the moving basket (B) or the vertical baffle unit (vb) may also be accomplished with a floating ring sliding outside the circular wall (cw1) of the upper casing (1a).

All gravimetric separated pollutants entering into the compartment 2 through the tubes 15 must have access to reach the central area/volume (Dz) through the net or other constructions of the of the basket (B) or baffle (vb) constructions, e.g. described in FIG. 6a,b.

Once the basket (B) or the baffle (vb) is full of rough solid pollutants there will be a clogging of debris in the guiding unit (Gu) resulting in a reduced skimming function and an increase of the difference between the external water level and the internal water level 7 and thus also an increase of the negative pressure inside the compartment 2. That can be sensed by the control unit of the motor that is structured to sense an increased power consumption of the motor, and as a result of that generate a control signal that is applied to the motor to reverse the rotational direction of the motor and thereby start the emptying phase.

Other sensing equipment may also be used to trigger start the emptying phase, e.g. various sensors to measure external and internal water levels.

FIG. 4c is a top view illustrating an example of a guiding unit (Gu). The guiding unit (Gu) is a preformed unit having an essentially circular shape with a diameter adapted to the diameter of the separator device where the unit is to be arranged in relation to the floater 5.

The guiding unit (Gu) is in one embodiment provided with more or less stiff fingerlike protrusions 22 directed inwards. It is further shown in FIG. 4c by means of examples 22a and 22b how the fingers 22 may be made to have both guiding functions and bending possibilities. The fingerlike protrusion 22a may be molded in suitable plastic polymer material where a bendable hinge is made by a narrow polymer contact between the outer ring 23 and the fingerlike protrusion 22a, 22b. Preferably, the fingers of the guiding unit have equal lengths, and the lengths of the fingers are adapted to the size of the device, i.e. they have a length that ensures that decided sizes of solid debris is guided to the discharge zone (Dz).

FIG. 4d is a perspective view illustrating an example where this embodiment may be used, where the device being completely scalable up and down. The device is in this example adapted to collect absorption material purposely spread on to a surface area to absorb floating or toxic pollutants into a suitable floating storage bag (SB). After collection and freed from impurities the absorption material may be reused.

During the collecting phase the floater and its circular enclosed air volume will result in positive displacement that strives to elevate the skimming and separation device out of the water.

During the emptying phase it will be the other way around. Water and pollutant will be elevated above the water level resulting in an increased weight of the device that will have a deeper position and thus lower the height that is needed to transfer the pollutant to the collecting storage bag.

This will have impacts on to how the pontoons have to be made especially when large units are made. They can be balanced be using ballast of water together with floating volumes in such a way that collecting and emptying phases can work with low pressure gradients and thus through high flow rates work with very low energy consumption. These embodiments will therefore be very suitable to be powered by solar power even when used as large offshore units.

FIG. 5a is a top view illustrating an example of a non-clogging guiding unit embodied as a coalescence filter (CF). Coalescence is the process by which two or more droplets, bubbles, or particles merge during contact to form a single daughter droplet, bubble or particle. The filter comprises thin lamellas 31 attached to hooks 32 sitting on spokes 33 that in turn is fixated to a central hub 34. The lamellas 31 both ensure that coalition can be achieved and that decided sizes of non-floating solid debris can pass through the filter. They can be winded in a counter direction to the rotational direction of the central rotational flow. The object is to create turbulences that facilitate remaining small droplets of oil to coalescence against the lamellas, increase in size and finally as larger oil drops end up to the collecting volume of the compartment 2.

Figure 5B:
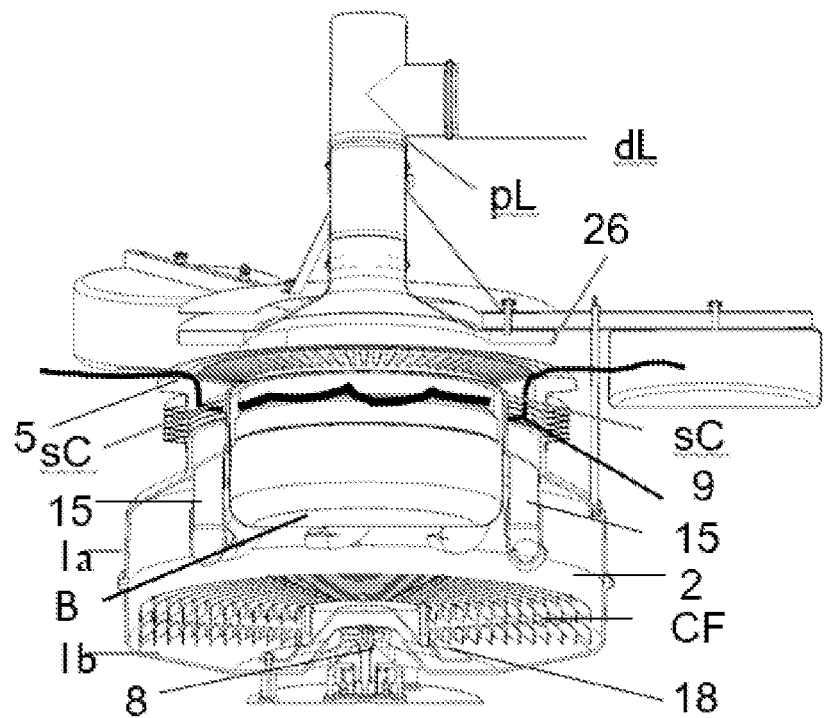
FIGS. 5b and 5c illustrates various views of further embodiments of the skimming and separation device according to the present invention.

In applications where leaves, plastic stripes or other pollutants which are large in area but thin in volume, an extra thin net can be placed on top of the Coalition filter (CF) or being a part of coalition filter (Cf) in FIG. 5b,c to generate the centrifugal collecting flow pattern (ccF) (the tornado effect) described above.

Figure 5C:
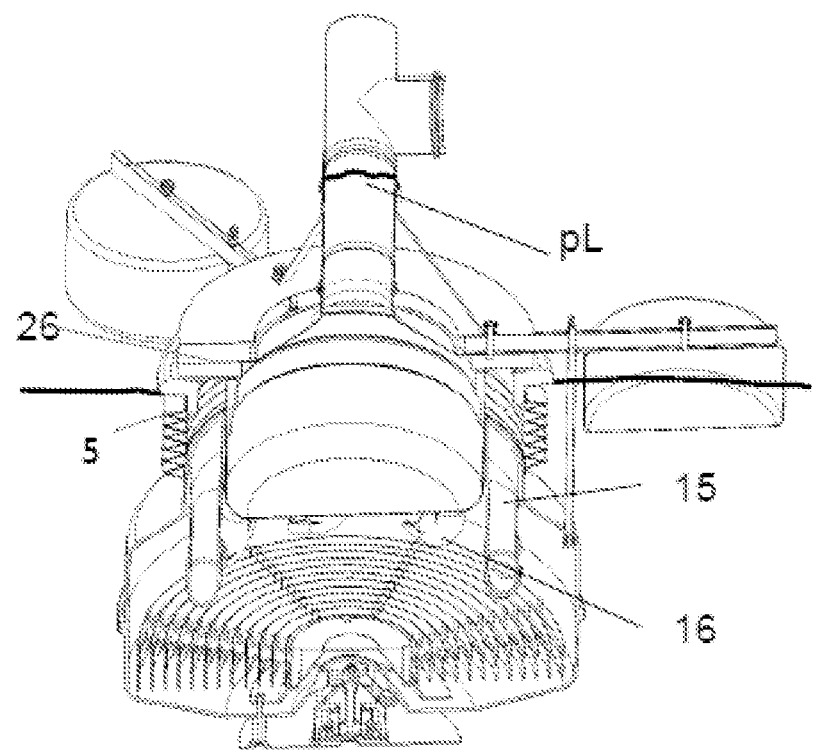

FIGS. 5b and 5c show perspective cross-sectional views of another embodiment according to the invention being related to the peripheral vertical flow (pvF) technology platform with an open access to the internal collecting compartments of the devices.

FIG. 5b illustrate the collecting phase of another embodiment of the skimming and separation device according to the peripheral vertical flow (pvF) technology platform with an open access to the internal collecting compartments of the device. Its fundamental working principals are described in detail in relation to FIGS. 4a-4d and will not be described here. The differences between these two embodiments are that the present embodiment, during the discharge phase, is arranged to transfer collected pollutants into tubes with specified vertical heights for further transportations of the pollutants to a suitable storage tank. This takes more energy during the emptying phase, that usually is very short, but it offers an opportunity to create a very precise regulating system to decide where to stop the emptying phase before water enters into the discharge level (dL) for further transportation to a storage tank.

The tube height makes it possible for very efficient and easy regulating functions.

The force needed to force a water column to a certain predetermined horizontal level (pL) below the output of the T-tube (dL) is always higher than the force that is needed to force the same amount of collected pollutants at the same horizontal level. That can be used for control purposes (e.g. by varying the rotational speed of the motor and/or the current applied to the motor).

FIG. 5c illustrates the device during the discharging phase. During that phase the rotational direction of the propeller 8 of the motor will be reversed and force water into the compartment 2 and close the floater 5 towards the lid 26 as being described and illustrated in FIG. 4b, and further start pushing the pollutants in front of it. The water level will however stop at the predetermined level (p1) due to propeller slip, and if that is set below the outflow level (d1) that will minimize the risks that the water will be discharging from the separator into the storage tank. Higher predetermined water columns (p1) offer better regulating possibilities, with more stabilized rotational speed, motor current and propeller slip functions.

It has been shown that e.g. with covering the lamellas on top of the coalescence filter (CF) in FIG. 5a,b with a thin net (CFf), see FIG. 6a, that the net will prevent that thin pollutants like plastic sheets and leaves do not stack or pas through the coalescent filter. The horizontal rotating fluid above the coalescence arrangement not only creates an even vertical distribution of flow through the coalescence arrangement but also generate horizontal centrifugal forces that generate a centrifugal collecting flow pattern (ccF) with a tornado like collecting effect. The pollutants just continue to rotate until they pass to the collecting volume of the compartment 2 or just keep on rotating if they have lower densities than water, until the collecting and separating compartments are ready for the emptying phase. This prevents that leaves, plastic sheets and other thin but large area pollutants do not reduce the flow of water and liquid pollutants like oil through the coalescence filter.

The start of the emptying phase can be controlled by the resistant through the net and/or the coalescence filter that in some embodiments just can serve as a support to the net if only solid debris like leaves, sheets of plastic are being collected. It has further been shown that when the generated horizontal rotating forces are acting closer to a suitable low resistant coalescence filter, or a thin net, these forces become more effective to prevent clogging of the net and coalescence arrangement as mentioned above. Oil drips however coalescence against the lamellas, increase in size and finally as larger oil drops end up to the collecting volume of the compartment 2.

Figure 6B:
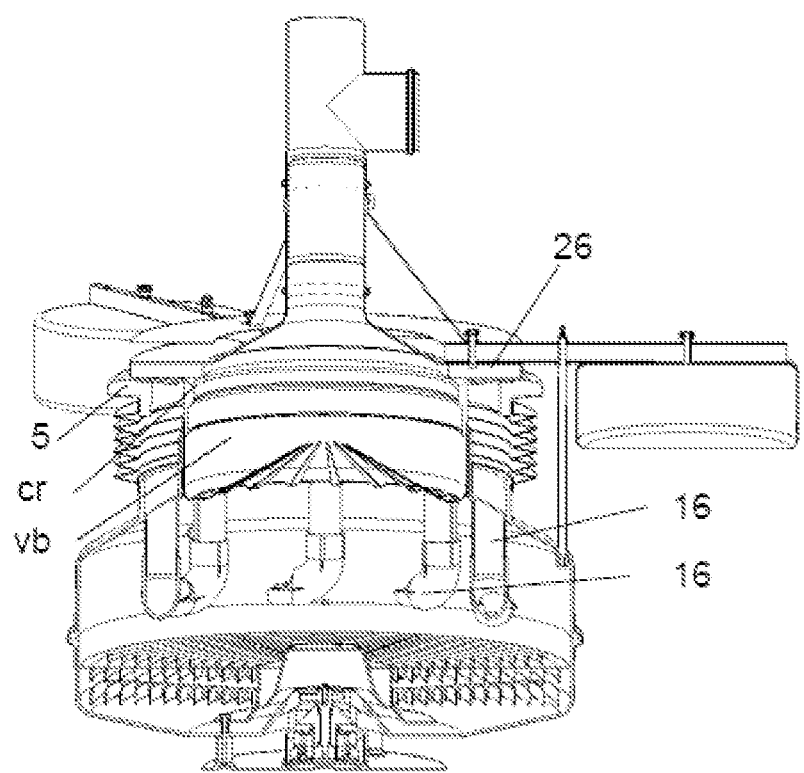

FIGS. 6a and 6b illustrate cross-sectional views of still other variations of the skimming and separation device being based upon the peripheral vertical flow (pvF) and the (ccF) flow patterns. The baffle unit (vb) is in this embodiment provided with fingerlike protrusions (vbf) to prevent that larger solids that are directly collected into the discharge zone do not enter into the separating zones. The coalescent filter (CF) is provided with a thin net (CFf) to prevent that e.g. leaves and thin plastic sheets do not stuck to the coalescent filter (CF), but instead starts to rotate according to the centrifugal collecting flow pattern (ccF).

FIGS. 7a-7d illustrate cross-sectional views of still other variations of the skimming and separation device being based upon the peripheral vertical flow (pvF) technology platform with an open access to the internal collecting compartments of the device. In these variations the device is provided with a continuous drainage of pollutants by suction forces to a suitable vacuum tank.

Figure 7A:
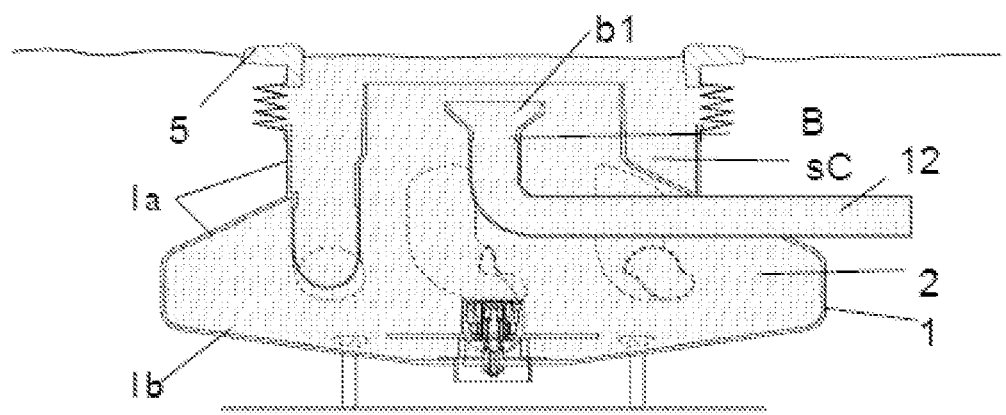
FIGS. 7a-7d illustrates various views of still further embodiments of the skimming and separation device including transportation of collected pollutants according to the present invention.

In FIG. 7a is shown the skimming and separation device suitable for collecting floating pollutants like liquids and foam, in a resting non-active position.

A floater 5 (without a guiding unit as shown in FIG. 4a) is provided and being configured to create the skimming function of the device. The floater is attached at its lower side to an essentially vertically arranged bellow 4 allowing the floater to move from an upper position shown in FIG. 7a with essentially no flow into the compartment 2 to a lower position shown in FIG. 7b generating a skimming wear as described in relation to FIGS. 4 and 5. The flow of water and debris 6 in a downward direction is first entering into a collecting toroid shaped open skimming compartment (sC) that is structured to concentrate thin floating layers into a thicker layer 9. The toroid shaped skimming and concentrating compartment (sC) is limited in area by preferably circular walls (cw1) and (cw2)

The skimming flow on to the thicker layer 9 in the skimming and concentrating compartment (sC) generates turbulence that forms drops of e.g. oil and/or foam that with an appropriate flow rate in the tubing 15 will enter into the separation and collecting compartment 2. Finally these pollutants enter into the internal collecting volume and the discharge zone/volume (Dz) that, in accordance to this embodiment, is open to atmospheric pressure.

Figure 7B:
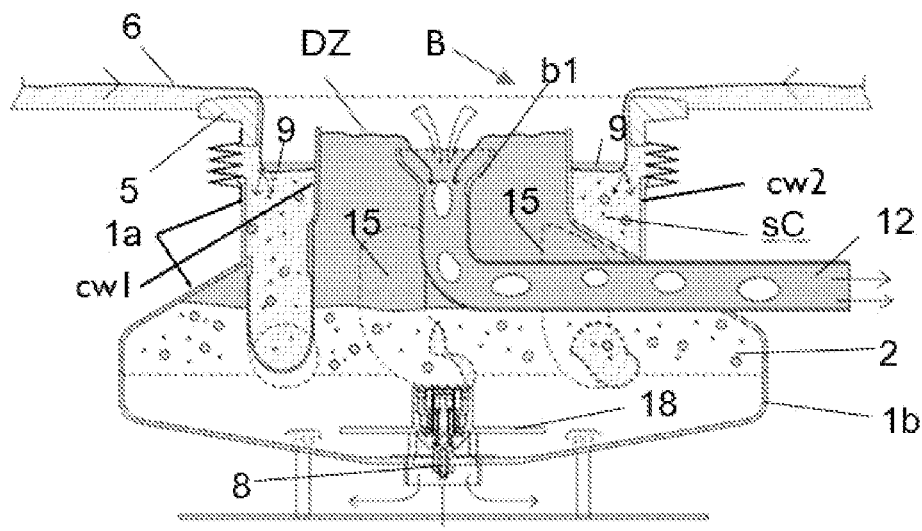

In FIGS. 7a and 7b a suction tube 12 is shown, structured to enter the device through the side wall and bends upwards and ends in a suction nozzle b1 that has a funnel structure that widens upwards at a level slightly below the level of the floater 5. The nozzle (b1) attached to the suction tube 12 provides a bypass member (BP) that is open to atmospheric pressure. The suction tube 12 that is attached to, and passes through the compartment 2 is further being connected to a vacuum container (not shown).

When an increasing amount of pollutions are settled in the open collecting part of the compartment they will start to rise above the water level 9 of the skimming compartment (sC) due to the fact that the collected pollutants have a lower density than water. The suction nozzle b1 in combination with the open bypass arrangement BP will continuously remove the collected debris 6 by using a mix of air (or steam and/or hot water if e.g. thick crude oil is to be collected), from the separator without any disturbances of its separating function and also keep the collected pollutions in rapid motions to the storage tanks. The continuous removal of pollutants with no need of support from a reversing propeller force may considerably increase the separation capacity of the device.

If the density of the collected pollution is close to that of water the gravimetric forces generated by the collected pollutants will be too low to force the pollutants into the vacuum nozzle b1. In these cases, the rotational speed of the propeller 8 may be temporarily reduced by a control unit (not shown) getting signals from e.g. capacitance sensors that e.g. are attached to the vacuum tube 12 (not shown) resulting in that the water level and thus also the collected debris will come closer to the inlet of the nozzle (b1). This problem may also be solved as by the embodiments that is disclosed in FIGS. 7c and 7d by increasing the height of the collecting part of the main separating and collecting compartment 2.

Figure 7C:
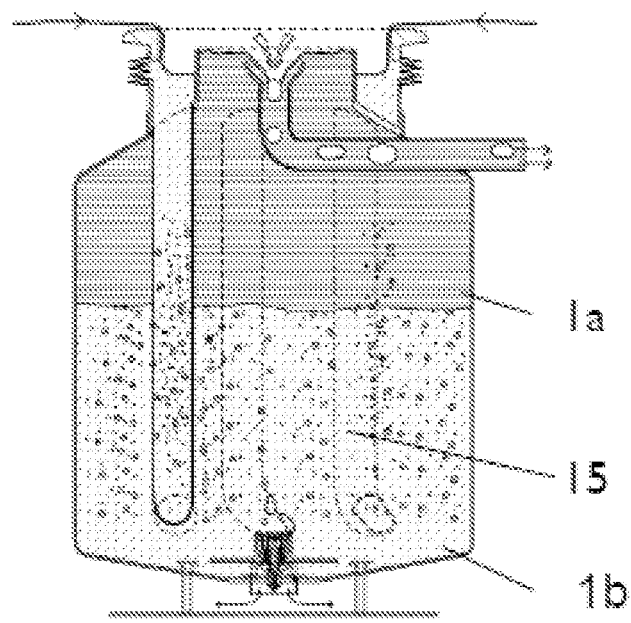

FIG. 7c illustrates a separation device of type (pvF) where the upper part (1a) of the casing 1 and the transporting tubes 15 are prolonged to generate a larger collecting volume as well as a larger depth of the collected pollutants volume to create larger floating forces when the densities of collected pollutants are being close to the density of water. The larger floating forces will force the collected pollutants into the suction nozzle (b1) and will be discharged together with a mix of air (or steam and/or hot water if e.g. thick crude oil is collected) to a suitable vacuum tank (not shown).

Figure 7D:
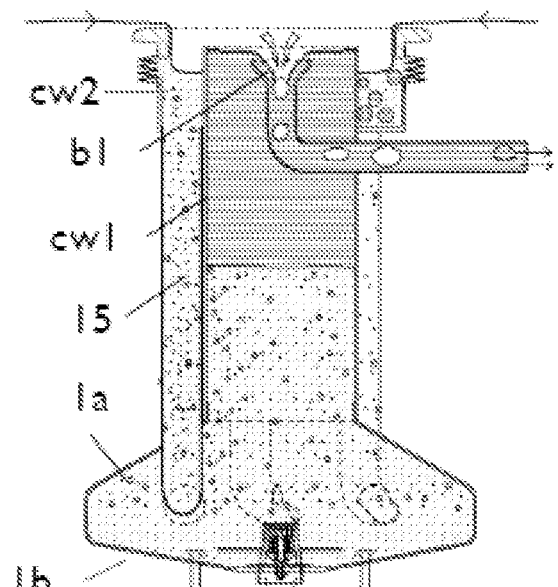

FIG. 7d illustrates a separation device of type (pvF) where the circular wall (cw) as part of the upper casing (1a) described in relation to FIG. 4b and the transporting tubes 15 are prolonged to achieve a larger collecting volume as well as a larger depth of the collected pollutants volume to create larger floating forces when the densities of collected pollutants are being close to the density of water. Larger depth of the collected pollutant will generate stronger floating forces that will force the collected pollutants into the suction nozzle (b1) for further transportation with a mix of air (or steam and/or hot water if e.g. thick crude oil is collected) to a suitable vacuum tank (not shown).

Figure 8A:
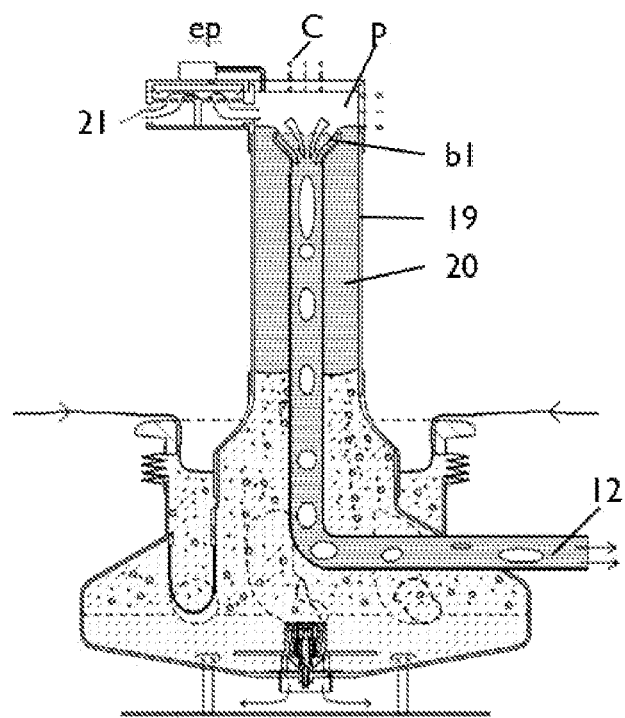
FIGS. 8a-8c illustrates various cross-sectional views of embodiments of the skimming and separation device including transportation of collected pollutants according to the present invention.
Figure 8B:
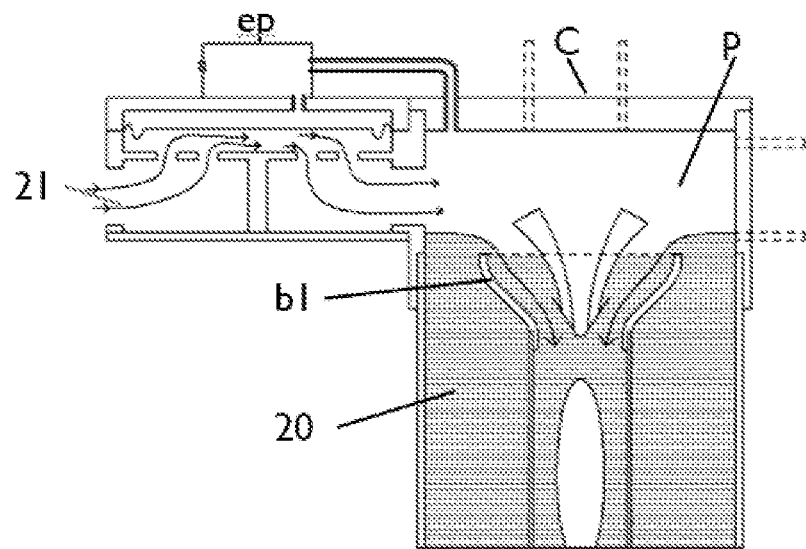
Figure 8C:
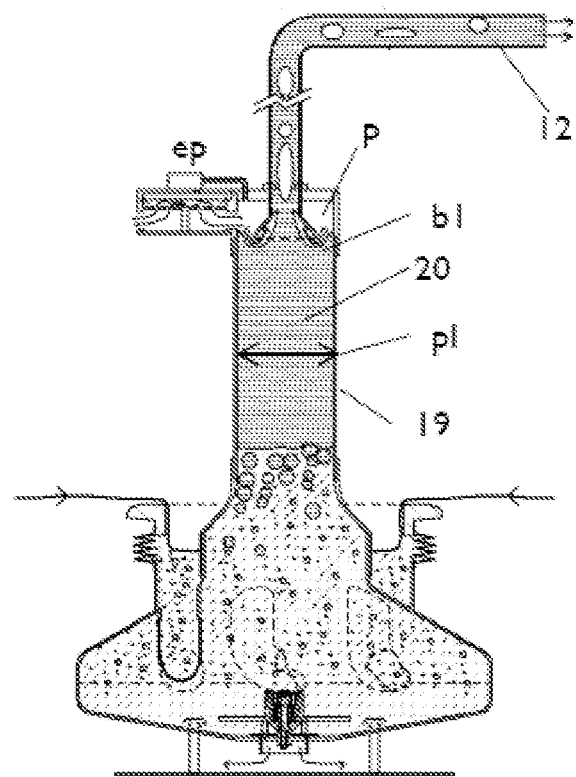

FIGS. 8a-8c are examples where a vacuum power source is powering a pilot (p) operated regulator or an electropneumatic regulator member (ep) to create a constant negative pressure bypass member C.

In FIG. 8b this pilot (p) operated regulator or an electropneumatic regulator member (ep) is illustrated in a larger scale.

The constant negative pressure will increase the height of the collected debris 20 in the tube 19 resulting in increased floating forces which means that if a water column should replace the collected debris it would be too heavy to reach the outlet level of the nozzle (b1). The water level would stop at a preset level (p1), being described in relation to FIG. 5c, and would thus secure that no water is entering into the collecting vacuum tank.

The bypass member (C) is configured to continuously take care of the collected debris that enters into the airflow such that a mixture of air or e.g. hot steam facilitate transportation of collected pollutions to a suitable vacuum tank (not shown) without interference with the separating functions of the device.

If there are low amounts of pollutants to be separated, sensors may be provided (not shown) to e.g. shut off the vacuum power source.

It should be noted that the embodiments in FIGS. 7 and 8 can be provided with coalescence filters as being described in FIG. 6 to achieve the centrifugal collecting flow pattern (ccF).

In FIGS. 9-14c, d are illustrated the new peripheral vertical and horizontal flow (pvhf) or the new peripheral rotating and horizontal flow (prvhF) platforms together with the baffle unit (vb), separating the skimming compartment (sC) and the main separating compartment (2) from the collecting and discharge zoon (Dz). These embodiments can further, according to the invention, be provided with coalescence arrangements to generate the centrifugal collecting flow (ccF) platform.

FIGS. 9a and 9b are a cross-sectional views of an embodiment of the skimming and separation device according to the invention that is related to the new peripheral vertical and horizontal flow (pvhF) platform without connecting vertical tubing and with an open access to the internal collecting compartments of the device.

Generally, the skimming and separation device according to the (pvhF), (prvhF) and (ccF) platforms being described below comprises an external casing (1b) that besides being a part of the open compartment 2 also serves as a platform for other constructions as e.g. floaters (not shown).

The casing (1b), earlier being described as a part of the assembled casing 1 in FIG. 2a, provides, together with the floater 5 attached to a vertically arranged bellow 4, a compartment 2 with an open surface area (2A) that not necessary is limited to the diameter of the casing (1b).

The open surface area (2A) is provided with a vertically arranged and preferably cylindrical baffle unit (vb) which can be floating and/or be attached to the floater 5 or to the outer casing (1b). By adding a baffle unit (vb) to the surface area (2A), a skimming and concentrating compartment (sC), a separating and collecting compartment 2, and an open collecting area/volume (Dz) will be provided.

The baffle unit (vb) serves two main two main functions. It serves as a barrier between collected liquid and solid pollutants, and further depending on shape and lower end construction, it can facilitate the centrifugal collecting flow platform (ccF). The baffle unit (vb) can be easily being changed to serve different kinds of custom demands.

In FIG. 9a the peripheral rotating vertical flow pattern (prvF) and (ccF) technology platform may be provided with a bypass member (BP) with a nozzle (b1) that is open to atmospheric pressure, which has been described in relation to FIG. 7,8. The bypass member BP with a suction nozzle (b1) is in this example provided with a flexible member (b2) that may be attached to the outer casing (1b) with a rod (1r). The nozzle is connected to a suction tube 12 that further is connected to a negative pressure (vacuum) source and container (not shown).

The bypass member is open to the atmospheric pressure 13 and will, in combination with the negative pressure (vacuum) in the suction tube 12, create suction forces that will create a flow of air that continuously will take care of the collected debris that enters into the airflow. Thereby a mixture of air will facilitate transportation of collected pollutions to a suitable vacuum tank (not shown) without interference with the separating functions of the device, i.e. the separating functions are bypassed.

FIG. 9b illustrates the device during a pollution collecting phase.

The debris 6 in this illustrated example consists of floating sludge and foam that may be a large problem in e.g. many wastewater treatment plants.

A floater 5 is provided and being configured to create the skimming function of the device. The floater is attached at its lower side to an essentially vertically arranged bellow 4 allowing the floater to move from an upper position with no flow as illustrated in FIG. 9a, to a collecting phase in FIG. 9b, where flow of water and debris 6 are entering into the device.

The water will follow the contours of the floater 5 and generate the water level 9 in the skimming and concentration compartment (sC). It will continue as a peripheral rotating vertical flow into the separating and collecting compartment 2, where the baffle (vb) is arranged to facilitate that pollutants are entering into the collecting volume and Area (Dz) defined by the baffle (vb).

The water level 9 is determined by the speed of the propeller 8, the floating forces of the floater 5 and by the force gradients acting on the bellow 4 in relation to its outside (VL) and inside 9 water levels.

In case of thick floating pollutants layers of e.g. sludge and foam, these layers can to a large extent "jump or float over" the vertical cylindrical baffle (vb) and accumulate on the surface area (Dz) and by the bypass member (BP) and vacuum power continuously be transported to a vacuum storage tank (not shown).

FIG. 9c is a perspective view of a ring with a plurality of wings (RW) that is structured to preferably be attached to the floater 5 or the casing (1b) in order to add rotating forces to water/pollutants in all the compartments defined by the baffle arrangement (vb). That will generate a peripheral rotating vertical and horizontal flow (prvhF) platform and a centrifugal collecting flow (ccF) platform according to the invention with access to the internal collecting compartments and is open discharge zones.

FIG. 10a illustrates one of the simplest embodiments related to the peripheral vertical and horizontal flow (pvhF) platform without connecting vertical tubing and with an open access to the internal collecting compartments of the devices e.g. designed for sludge and foams with low viscosities. The reference numbers and flow functions are the same as being described in connection to FIG. 9.

FIGS. 10b and 10c illustrate cross-sectional perspective views of an embodiment where a ring provided with plurality of wings (RW) as seen in FIG. 9c is attached to either the floater 5 or the casing (1b) in FIG. 10c in order to add rotating forces to liquid in all the compartments defined by the vertical baffle arrangement (vb).

The ring provided with plurality of wings (RW) is included in embodiments according to the invention working under the new (prvhF) and (ccf) platforms.

FIG. 10b illustrates an embodiment where the ring, provided with a plurality of wings (RW) (shown in FIG. 9c), is attached to the floater 5.

FIG. 10c illustrates an embodiment where the ring, provided with a plurality of wings (RW) (shown in FIG. 9c), is attached to the casing (1b) and where the floater 5 is provided with a guiding unit (Gu) to transfer solid pollutants directly to the surface of the collecting volume and surface area (Dz) and further by an adapted bypass unit (Bu) be continuously transported to a vacuum storage tank (not shown).

This illustrated embodiment may further be equipped with a coalescent filter (CF) and other filters with or without the net, as earlier being described and thus the embodiment according to the invention will work according to the centrifugal collecting flow pattern (ccF), for a final cleaning process of the water according to customer demands.

Figure 11A:
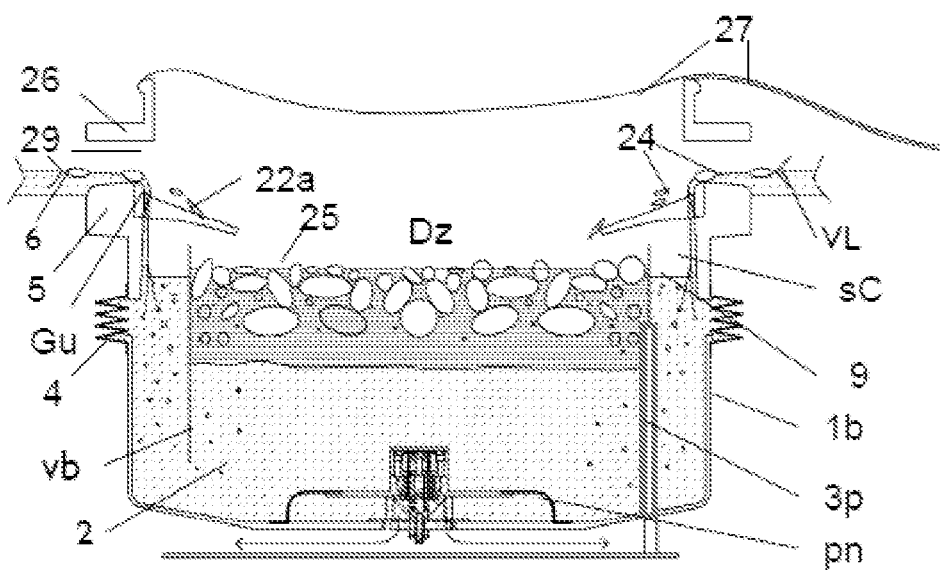
FIGS. 11a-c illustrates cross-sectional views of embodiments of the skimming and separation devices according to the (pvhF) platform in accordance with the present invention.

FIG. 11a illustrates a cross-sectional view of the skimming and separation device according to the (pvhF) platform during the collecting phase. During this phase, there will be an air gap 29 between the flow of water and debris and the lid 26 that e.g. a flexible hose 27 in combination with a suitable floating collecting bag can be arranged to generate an open or closed loop to the surroundings of the separator and the collecting bag as shown in FIG. 12c.

A floater 5, provided with a guiding unit (Gu) with fingerlike protrusions 22 (earlier described in relation to FIG. 4), is configured to create the skimming function of the device. The floater is attached at its lower end to an essentially vertically arranged bellow 4 that further is attached to the casing (1b), allowing the floater to move and generate a water level 9 in the skimming and concentrating compartment (sC). That level is determined by the speed of the propeller of the motor 8, the floating forces of the floater 5 and by the force gradients acting on the bellow 4 in relation to the external water level (VL) and internal water level 9 in the skimming and concentrating compartment (sC).

The flow of water 6 carrying the solid pollutant 25 will pass between the fingerlike protrusions 22 and enter into the skimming and concentrating compartment (sC) and further into the separating and open collecting discharge area/volume (Dz), defined by the vertical baffle arrangement (vb). The solid pollutants will be guided by the guiding unit (Gu) and be accumulated in the basket (B) from its top to its bottom.

The vertical baffle arrangement (vb) may comprised by a net having the shape of a circular cylinder having both ends open. It may then be attached at e.g. three points (3p) to the casing (1b). This variation is in particular adapted to situations where no liquefied floating pollution is to be collected. As being described in relation to FIG. 4 most of the water 6 carrying the solid pollutant 25 will pass between the fingerlike protrusions 22 and enter into the skimming and concentrating compartment (sC) and further into the separating and open collecting discharge area/volume (Dz), defined by the vertical baffle arrangement (vb).

The solids pollutants 25 with volumes will be forced, with a small amount of water by the guiding unit (Gu), to enter on to the top of the area and compartment (Dz). That means that this compartment will be filled with pollutants from its top to its bottom with very little turbulences. That further means that the device can more or less be totally filled with solid pollutants before a protecting net (pn) provided around the propeller 8 will be clogged which in turn resulting in a requirement of increased current to the motor. By measuring the current supplied to the motor an indicator for starting the emptying process is obtained that will be used to generate signals from a control unit (not shown) for starting the emptying process by reversing the motor.

Figure 11B:
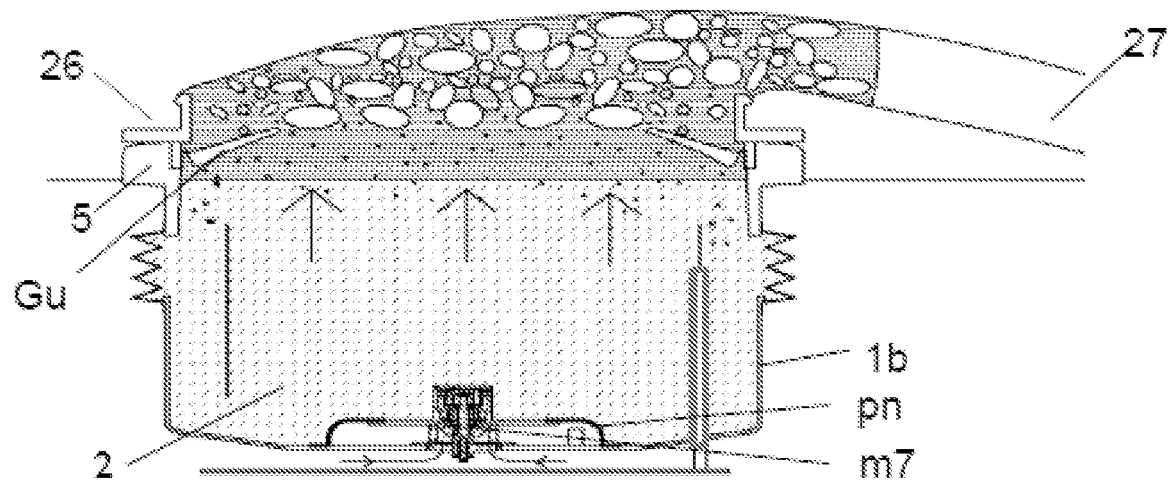

FIG. 11b illustrates a cross-sectional view of an embodiment of the skimming and separation device according to the (pvhF) technology platform, during its emptying phase. During this phase the propeller 8 will change its rotational direction, in comparison to the rotational direction during the collecting phase illustrated in FIG. 11a, which is achieved by a control signal from its control unit (not shown). This will reduce the negative pressure inside the compartment 2 and start to generate a positive pressure. That will result in that the floater 5 will move upwards until it is in direct contact to the lid 26. After that the whole area (2A), see FIG. 9a, will be subject to an increasing pressure. This means that collected pollutants that might have started to clog the protecting net (pn) around the motor unit (m7) now is being washed away and now by the backflow, have the possibilities to enter into the collecting hose 27 on both sides of the vertical baffle arrangement (vb).

The whole surface area of the collected pollutants will now be forced to leave the separator and in accordance with these embodiments enter into a suitable collecting filtering storage bag (SB) as shown in FIG. 12c and thus describing an open loop between the separator and the surrounding water.

The created fluid height during the emptying phase will force the whole device floating on pontoons with adapted floating characteristics (not shown) to sink deeper, which will decrease the need of elevating forces for discharging the pollutants into e.g. a filtering storage bag (SB). This will reduce the energy consumption and work in favor for a solar cell (sc) powered surface cleaning system even in large scale to clean rivers, lakes, and oceans.

Figure 11C:
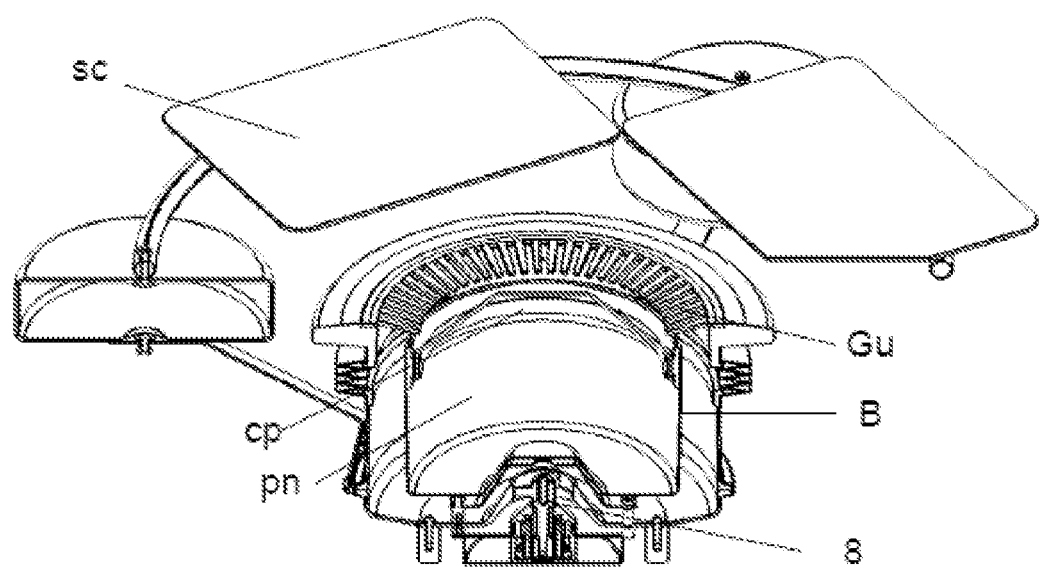

FIG. 11c illustrates a cross-sectional view of an embodiment of the skimming and separation device according to the (pvhF) platform, with an open access to the collecting and outlet zone (Dz). The vertical baffle arrangement (vb) described in FIG. 11a is in this embodiment replaced by a floating circular basket (B) that has an upper non-transparent floating cylinder part (cp) with a certain vertical height and a lower thin stainless steel or polymeric net (pn). The primary use of the device according to this embodiment is for collecting solids with volumes and therefore there will be no need for a protecting net (pn) around the motor unit (m7). Floating debris with large areas but no volumes like leaves, sheets of plastic, passing through the guiding unit (Gu) will pass through the propeller 8 that can be of a cutting tube. There will not be any increased resistance to be sensed, before the guiding unit (Gu) starts to be clogged, which under normal conditions may happen when the floating bucket cannot handle any more pollutants. Once that happens there will be more or less a sudden increase of the under-pressure and level changes inside the skimming and concentrating compartment (sC). This will be detected as a change of current consumption of the power device, which in turn will initiate that the control unit will apply a control rule that will continuously and repetitively execute control instructions in order to increase and decrease the rotational speed of the propeller. That will result in up and down going motions of the floater 5 and increase the forces that will force the solid debris into the discharge zone (Dz). When the zone starts to be full, variation in motor current will be changed, and the software in the control unit (not shown) will start the emptying phase.

FIG. 12a-12c illustrates embodiments of skimming and separation device in collecting and discharge phases, where the device basically have essentially the some separating functions as in FIG. 9a,b, 10b, 11. That means that these embodiments are based on the new (pvhF) platform with no rotating forces, and thus being more suitable to collect large pollutants and e.g. foam than floating liquid pollutants like oil.

The primary use of the device according to this embodiment is for collecting solids with volumes and therefore there will be no need for a protecting net (pn) around the motor unit (m7). Floating debris with large areas but no volumes like leaves, sheets of plastic, passing through the guiding unit (Gu) will pass through the propeller (8) of e.g. a cutting type. There will not be any increased resistance to be sensed due to a clogged protecting net as it is not present, before the guiding unit (Gu) starts to be clogged, which may under normal conditions happen when the floating bucket cannot handle any more pollutants. This will be detected as a change of current consumption of the power device and will start an emptying process that earlier have been described.

It should be noticed that if any of the embodiments illustrated in FIGS. 9-12 would be provided with features to work according to the (prvhF) and (ccF) platforms, these embodiments will be able to take care of solid debris like leaves, sheets of plastic. Under such conditions, the basket shape and size should be as e.g. being illustrated in FIGS. 9, 10, 13a, 14c, 14d.

Tests have shown that the vertical baffle arrangement (vb) to a very little extent have negative impact to the rotating flow patterns that are introduced by the plurality of wings (RW). This means that the depth of the vertical baffle (vb) shown in FIG. 9a may be optimized such that the distance between the bottom of the basket and the bottom of the casing (1b) or the coalescence arrangement can be arranged for an effective separation according to the customer needs.

FIG. 13 a-c show a skimming and separation device according to the (prvhf) and (ccF) powered by a solar panel (sp) with a battery pack (bp) and maneuvering fans (mf) that can turn the whole separator around its central vertical axis. The motor outlet is provided with a baffle (tb) that can direct the outlet flow from the propeller (8) in a certain direction and force the separator to move in the opposite direction. The maneuvering fans (mf) can turn the separator with low energy consumption and thereby make the separator to follow GPS-signals handled by the control unit (cn) to clean decided areas. Thus, the control unit is configured to receive positioning data, e.g. from a GPS-signal, that is processed and then applied to the maneuvering fans. The baffle unit (vb) is in this embodiment provided with fingerlike protrusions (vbf) to prevent that larger solids, that are directly collected into the discharge zone (Dz), do not enter into the separating zones as earlier described.

FIG. 13b is a side view of this embodiment.

FIG. 13c is an oblique overview of the embodiment to show how a storage bag (SB), as in FIG. 12c, or a handheld collecting sack, can be attached to the separator during an automatic or a manually ordered emptying process.

FIG. 14a show a perspective view, and FIGS. 14b-c show cross-sectional perspective views of various embodiments of the present invention illustrating the (pvF), (prvhF) and (ccF) technology platforms. The devices 14 a-d are provided with a bypass member (BP) with a suction nozzle (b1) is in this example provided with a flexible member (b2) that may be attached to the outer casing (1b) as described in FIGS. 9a and 9b, where the nozzle (b1) that is open to atmospheric pressure and thus may serve as a separating suction nozzle e.g. to clean water surfaces by hand.

Figure 14E:
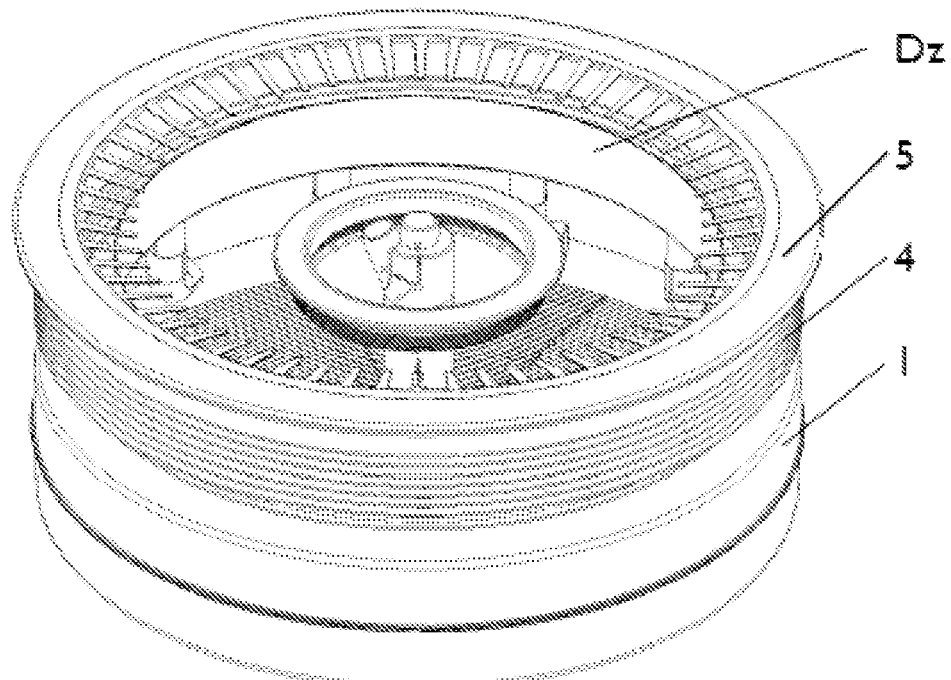

FIG. 14e is a perspective view of a large scaled skimming and separation device according to the (pvf) and (ccF) technology platforms provided with a strong outer casing 1. This embodiment is especially made for offshore oil combating, and it will work as being described in relation to FIGS. 4-9.

The difference of this embodiment in comparison to other embodiments described herein, is that a hydraulically driven ordinary skimmer is attached to the bottom of the casing 1 to take care of the collected pollutant in the open collecting volume and area (Dz) of the separating device. Floaters and associated deck construction for manpower and hydraulic machines that are required to operate the hydraulic skimmer are not shown.

However, the separating functions of the separator will always secure that no water will enter into the ordinary skimmer even at high waves.

All above embodiment according to the invention with peripheral vertical flow pattern (pvF) with an open access to the internal collecting and discharge cone (Dz), peripheral rotating vertical and horizontal flow (prvhF) platform and the centrifugal collecting flow (ccF) platform will dramatically improve the separating functions and capacity of the separator. The device according to these platforms optimize the conditions for effective gravimetric and centrifugal separating purifications and accumulation of pollutants to a collecting and discharge zone (Dz), to be finalized with an effective suitable transportation of collected pollutants as e.g. liquid, foam, algae and/or solids to a storage tank or e.g. a floating storage bag (SB) adapted to be a part of an open or closed loop to the surroundings.

In all the above embodiments, the propeller of the motor may be of a cutting type to avoid debris to wind up around the propeller. The above mentioned embodiments may also be used for building larger units and platforms for e.g. offshore use, lake and river cleaning where e.g. electric generators, steam generators, weed cutting equipment, screw pumps etc. may be applied to improve transportations of pollutants to a suitable storage unit.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:
1. A skimming and separation device comprising
an outer casing provided with constructions to directly or indirectly join all parts, and defining a compartment,
a floater configured to create a skimming function of the device, the floater is attached at its lower side to an essentially vertically arranged bellow allowing the floater to adapt flow into a substantially circum volume and allowing the floater to move from an upper position with essentially no flow into the compartment to a lower position allowing flow of water and debris to follow the contours of the floater in a downward direction into the device,
a power device with a propeller, wherein said power device is configured to be controlled by a control unit such that various flows and pressures may be generated to control in-flow and outflow of the device,
at least one peripheral flow deflecting member arranged in relation to the floater and structured to achieve a rotational movement of the downward directed flow of water and debris, in a horizontal plane and around a vertical longitudinal center axis of the skimming and separation device, and
a basket arranged within said compartment, wherein said basket comprises a floating circular ring defining an upper border of the basket and having a certain vertical height that is configured to prevent collected liquid and debris to pass the borders of the basket, and that the rest of the basket is structured to be arranged within a main separating area/volume of the device and includes netting or lamellas structured to allow free motions of collected debris into a collecting and discharge volume of the basket.

2. The skimming and separating device according to claim 1, wherein said peripheral flow deflecting member is arranged essentially below an inner periphery of said floater, and structured to achieve the rotational movement of the downward directed flow of water and debris essentially along the entire inner periphery of said floater.

3. The skimming and separating device according to claim 1, wherein said peripheral flow deflecting member comprises a ring provided with flow deflecting wings and configured to be attached to the floater.

4. The skimming and separating device according to claim 1, wherein said peripheral flow deflecting member comprises a ring provided with flow deflecting wings and configured to be attached to the casing close to said bellow.

5. The skimming and separating device according to claim 1, wherein the basket is configured as a baffle unit arranged within said compartment and structured to divide said compartment into a skimming and concentrating compartment and the collecting and discharge volume.

6. The skimming and separating device according to claim 1, wherein the device comprises an essentially planar and disc-shaped coalescent filter that is arranged in a horizontal plane in the lower part of the compartment.

7. The skimming and separating device according to claim 1, wherein said device comprises a guiding unit structured to be horizontally arranged along said floater, and wherein said guiding unit is provided with inwardly directed guiding fingers structured to guide solid debris directly to a discharge zone.

8. The skimming and separating device according to claim 1, wherein said control unit is configured to receive a measurement signal from the power device indicating the power consumption of the power device, and if the power consumption is above a predetermined threshold the rotational speed of the propeller is varied and/or the rotational direction is altered according to preset control rules.

9. The skimming and separating device according to claim 8, wherein said rules comprises a rule including control instructions to continuously and repetitively increase and then decrease the rotational speed and to alter the rotational direction.

10. The skimming and separating device according to claim 1, wherein the skimming and separating device comprises at least one maneuvering fan mounted at the device such that the device may be turned around its central vertical axis, and wherein said control unit is configured to receive positioning data and to control said at least one maneuvering fan in dependence of said positioning data.

11. A skimming and separation device comprising
an outer casing provided with constructions to directly or indirectly join all parts, defining a compartment,
a floater configured to create a skimming function of the device, the floater is attached at its lower side to an essentially vertically arranged bellow allowing the floater to adapt flow into a substantially circum volume and allowing the floater to move from an upper position with essentially no flow into the compartment to a lower position allowing flow of water and debris to follow the contours of the floater in a downward direction into the device,
a power device with a propeller, wherein said power device is configured to be controlled by a control unit such that various kinds of flows and pressures may be generated to control in-flow and outflow of the device, and
a basket arranged within said compartment, wherein said basket comprises a floating circular ring defining an upper border of the basket and having a certain vertical height that is configured to prevent collected liquid and debris to pass the borders of the basket, and that the rest of the basket is structured to be arranged within a main separating area/volume of the device and including netting or lamellas structured to allow free motions of collected debris into a collecting and discharge volume of the basket.

12. The skimming and separating device according to claim 11, wherein the device comprises an essentially planar and disc-shaped coalescent filter that is arranged in a horizontal plane in a lower part of the compartment.

13. The skimming and separating device according to claim 11, wherein said device comprises a guiding unit structured to be horizontally arranged along said floater, and wherein said guiding unit is provided with inwardly directed guiding fingers structured to guide solid debris directly to a discharge zone.

* * * * *